United States Patent
Finzer et al.

(10) Patent No.: US 6,945,829 B2
(45) Date of Patent: Sep. 20, 2005

(54) SELF-LOCKING SCREW CONNECTION

(75) Inventors: Carlo Finzer, Dasing-Rieden (DE); Peter Muninger, Bad Griesbach (DE)

(73) Assignee: Compagnie Deutsch GmbH, Martinsried (DE)

( * ) Notice: Subject to any disclaimer, the term of this patent is extended or adjusted under 35 U.S.C. 154(b) by 38 days.

(21) Appl. No.: 10/797,372

(22) Filed: Mar. 10, 2004

(65) Prior Publication Data

US 2004/0171317 A1 Sep. 2, 2004

Related U.S. Application Data

(62) Division of application No. 10/228,118, filed on Aug. 26, 2002, now Pat. No. 6,764,351.

(30) Foreign Application Priority Data

| Aug. 27, 2001 | (DE) | 201 14 120 U |
| Aug. 27, 2001 | (DE) | 201 14 103 U |
| Aug. 27, 2001 | (EP) | 01120439 |

(51) Int. Cl.[7] .................. H01K 13/514; F16B 37/16
(52) U.S. Cl. ............................... 439/752; 411/437
(58) Field of Search .................. 439/752; 411/437, 411/418, 549, 553, 554

(56) References Cited

U.S. PATENT DOCUMENTS

| 4,140,358 A |   | 2/1979  | Marechal |          |
| 4,281,857 A | * | 8/1981  | Randall .................. 285/34 |
| 4,500,153 A |   | 2/1985  | Mattingly, Jr. et al. |  |
| 4,686,738 A |   | 8/1987  | Bladh |         |
| 4,850,778 A | * | 7/1989  | Clough et al. ............ 411/433 |
| 4,880,343 A | * | 11/1989 | Matsumoto ................ 411/222 |
| 5,135,416 A |   | 8/1992  | Hass et al. |     |
| 5,139,380 A |   | 8/1992  | Reynolds |       |
| 5,178,504 A | * | 1/1993  | Falchi ................... 411/553 |
| 5,496,194 A |   | 3/1996  | Huss, Jr. |      |
| 5,541,377 A | * | 7/1996  | Stuhlmacher ............. 200/296 |
| 5,700,122 A | * | 12/1997 | Korpi .................... 411/551 |
| 5,931,695 A |   | 8/1999  | Scully et al. |  |
| 6,259,033 B1 |  | 7/2001  | Kassulat |       |
| 6,679,646 B2 | * | 1/2004 | Quardt et al. ............ 403/348 |

FOREIGN PATENT DOCUMENTS

| DE | 44 00 847 A1 | 7/1995 |
| DE | 94 02 108 U1 | 7/1995 |
| DE | 295 04 754 U1 | 9/1995 |
| DE | 199 30 044 A | 1/2001 |
| EP | 0 903 813 A | 3/1999 |
| EP | 1 065 426 A | 1/2001 |
| GB | 2 033 174 A | 5/1980 |
| GB | 22 61 775 A | 5/1993 |

* cited by examiner

Primary Examiner—Chandrika Prasad
(74) Attorney, Agent, or Firm—Quarles & Brady LLP

(57) ABSTRACT

A self-locking screw connection includes a cylindrical thread section (130) and a nut (300) that can be snapped onto the cylindrical thread section (130). The nut (300) has a thread that is divided into several thread segments (322), and the cylindrical thread section (130) has a plurality of threadless chambers (134) that are spaced from one another along the circumference of the cylindrical thread section (130). The threadless chambers allow immersion of one of the thread segments into one of the threadless chambers for providing a self-locking effect.

6 Claims, 19 Drawing Sheets

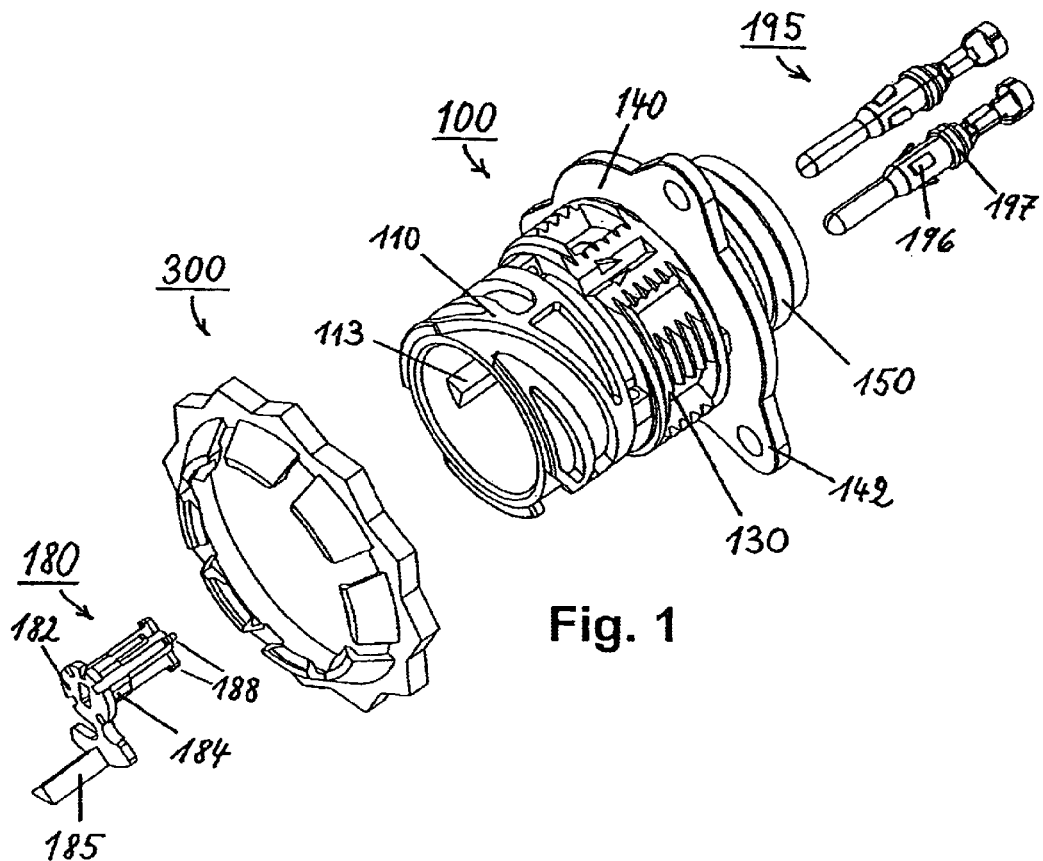
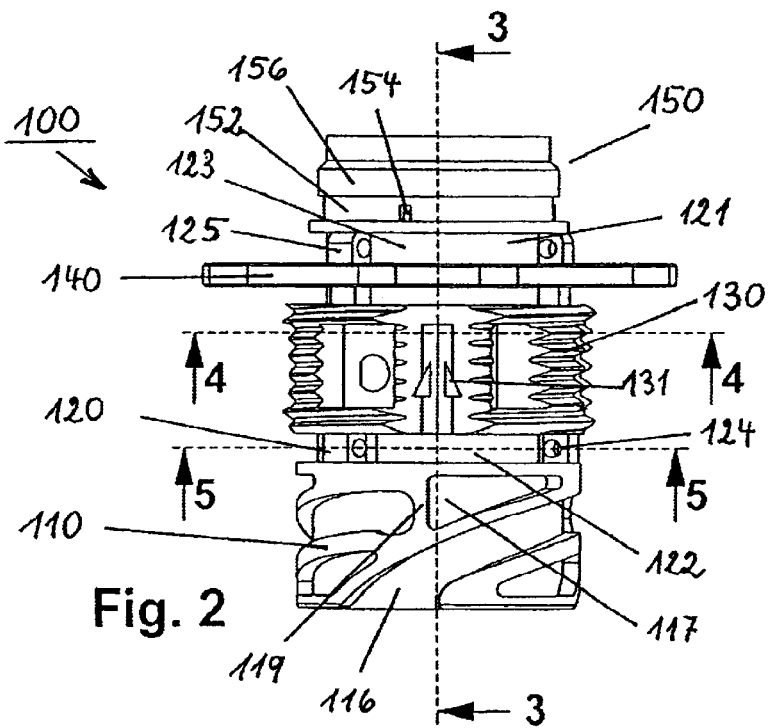
Fig. 1
Fig. 2

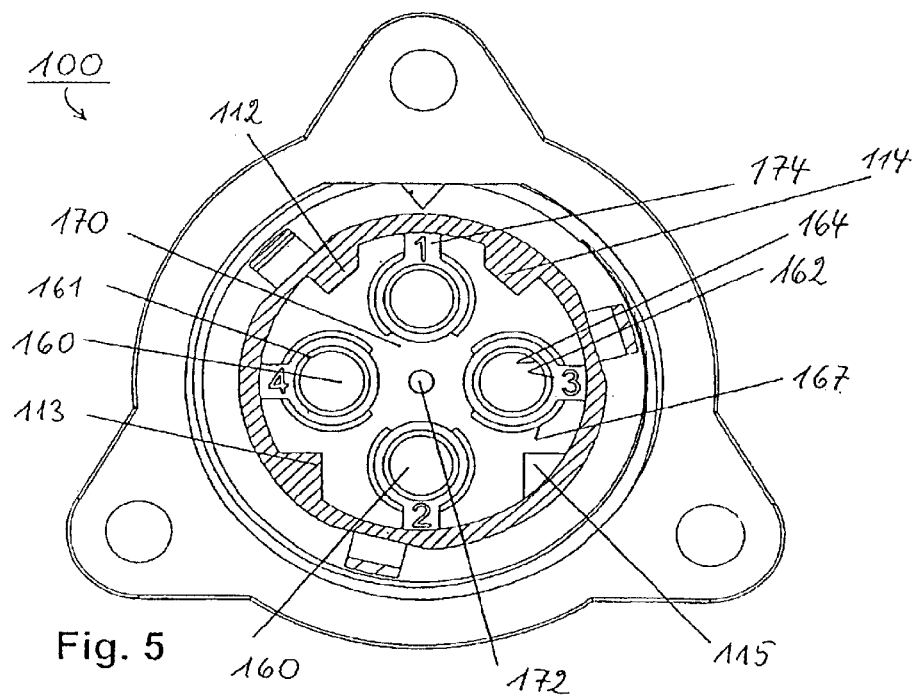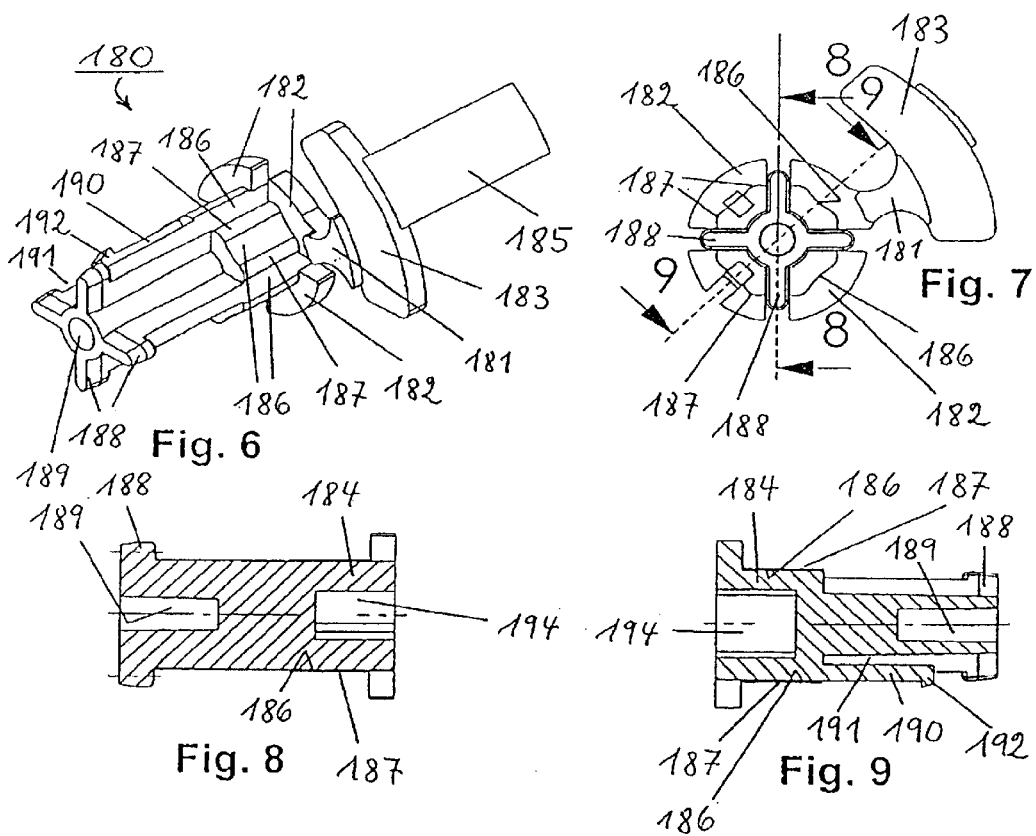

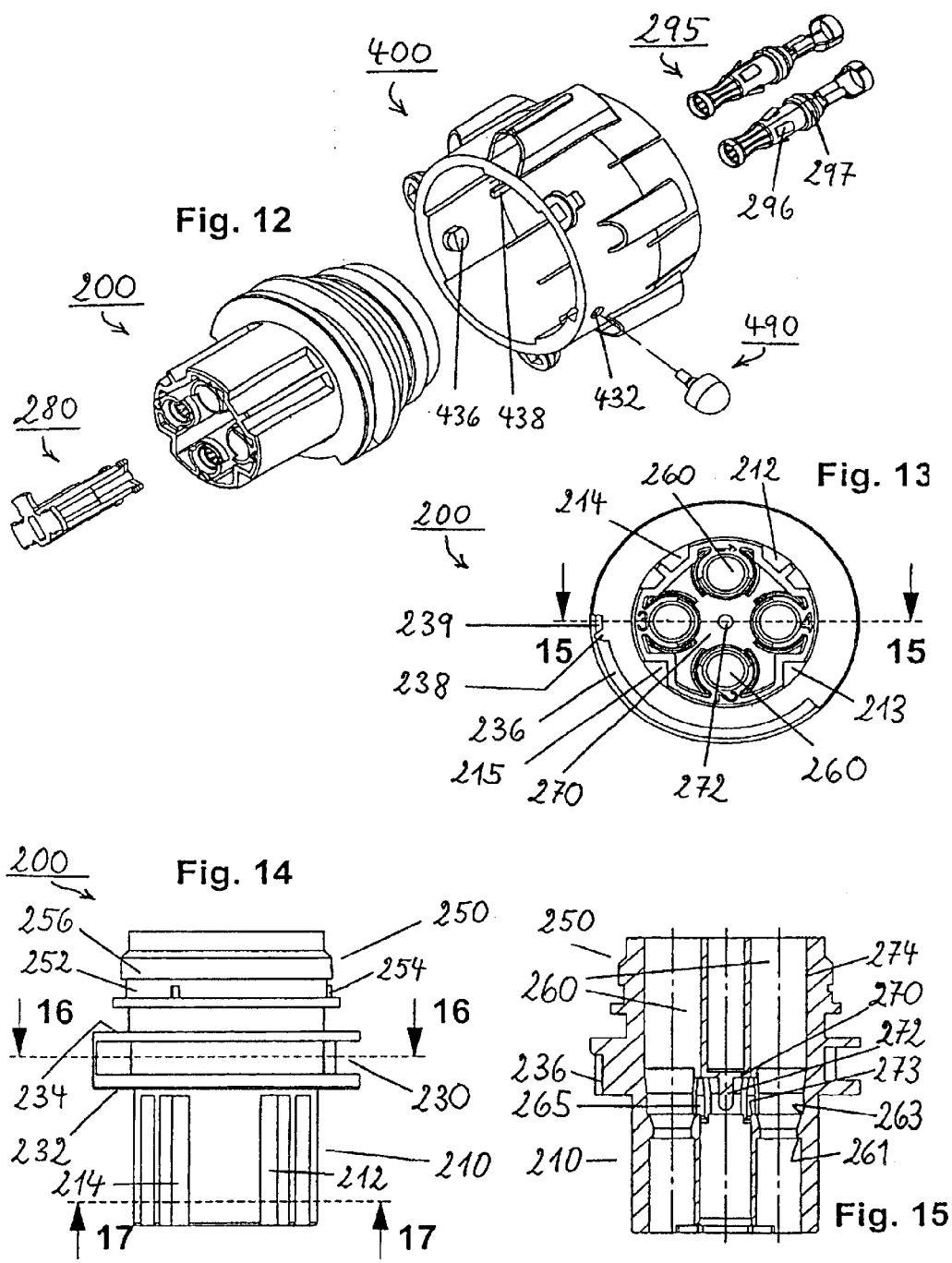

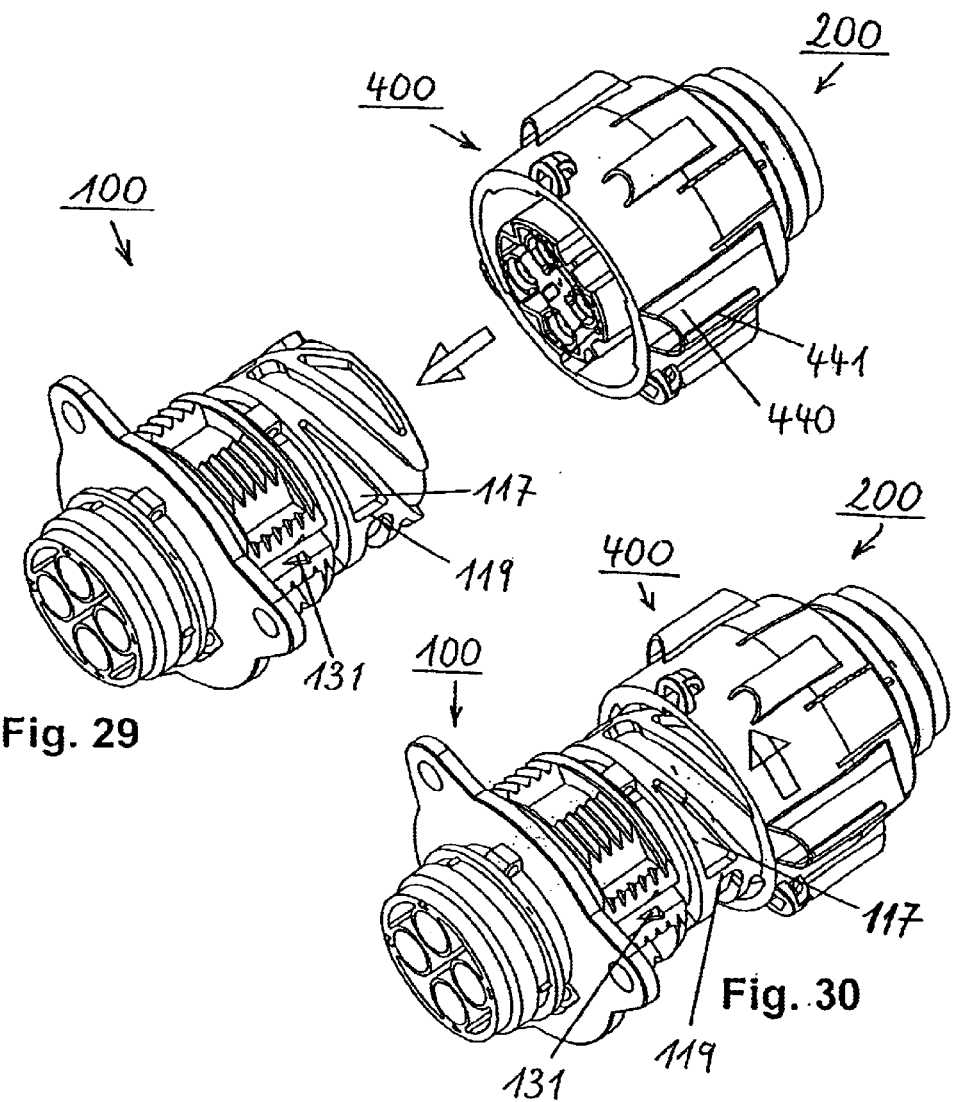
Fig. 29
Fig. 30
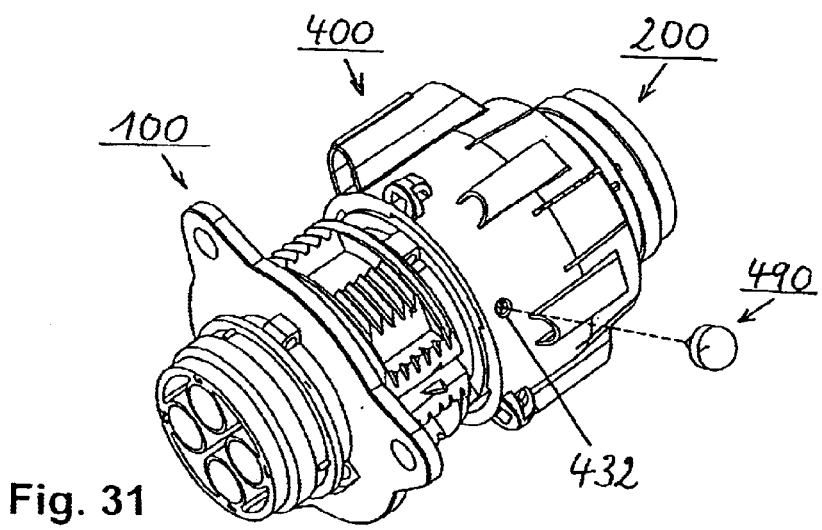
Fig. 31

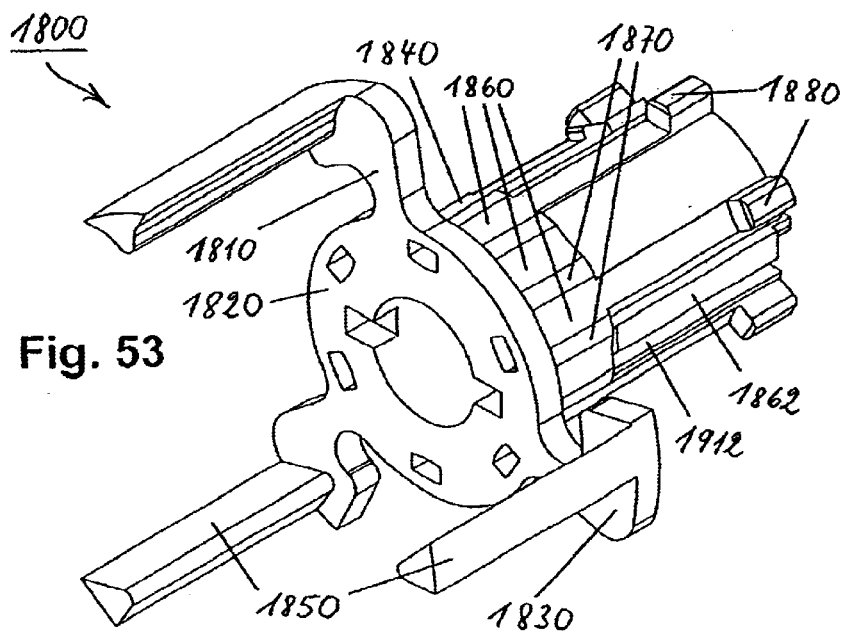
Fig. 53
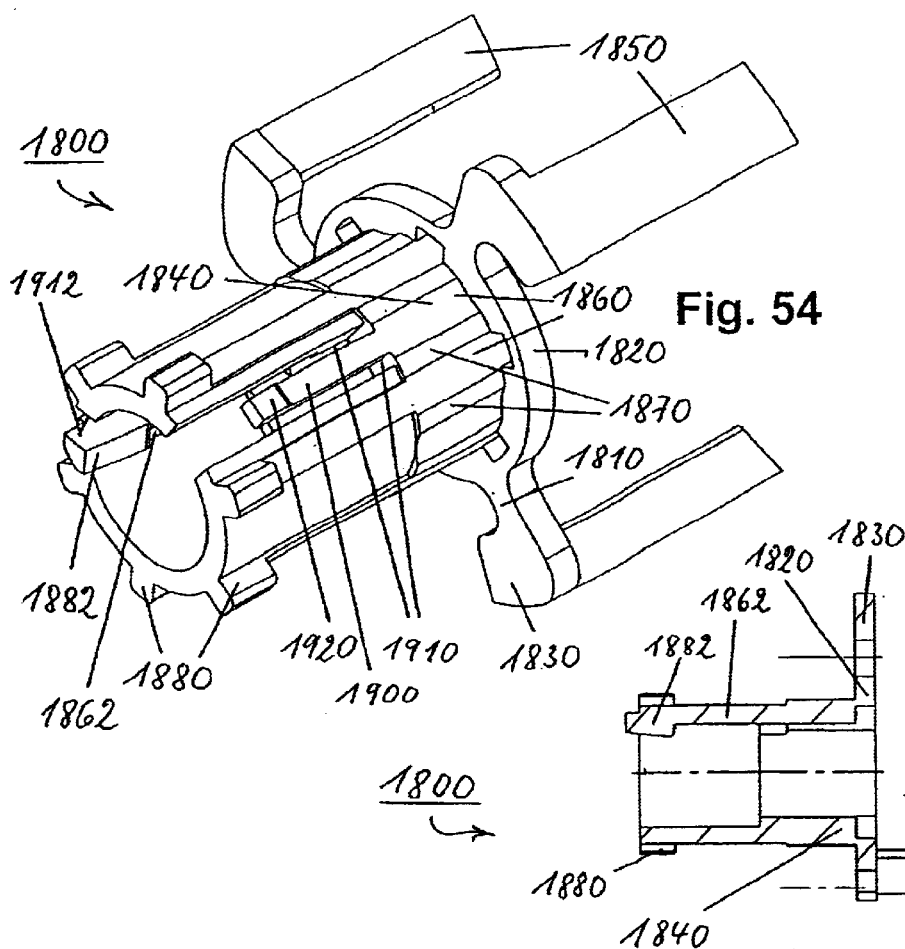
Fig. 54
Fig. 55

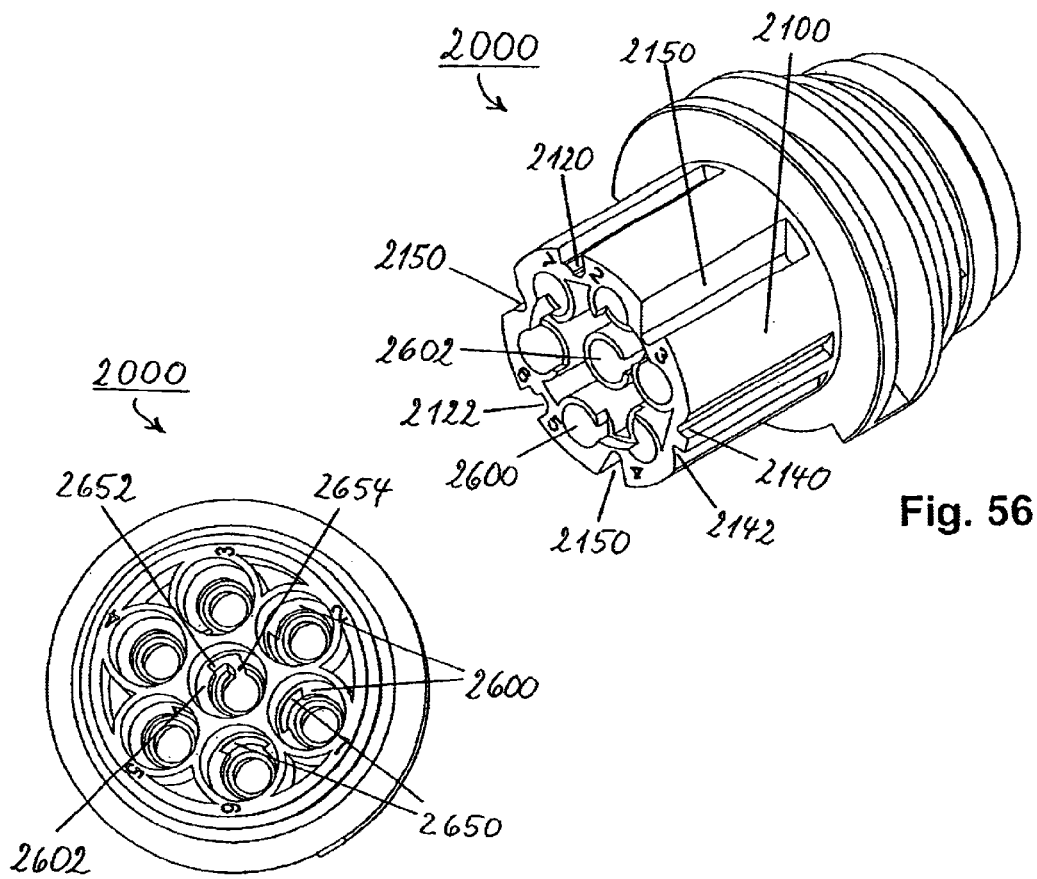
Fig. 56
Fig. 57
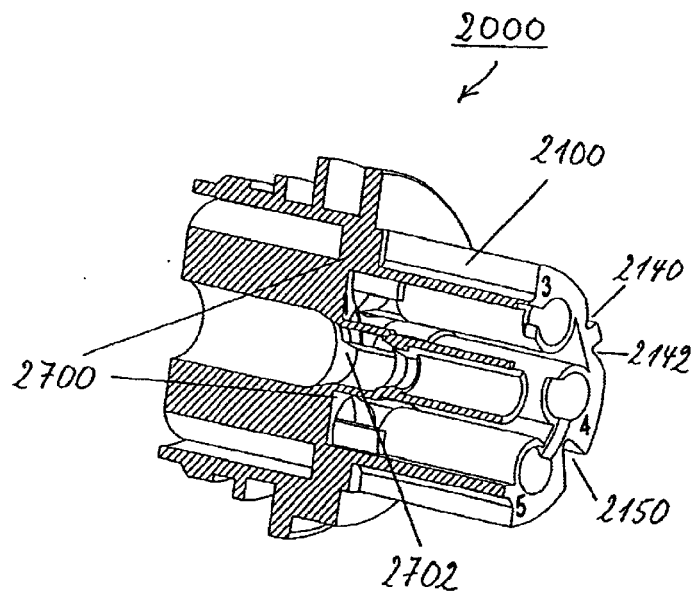
Fig. 58

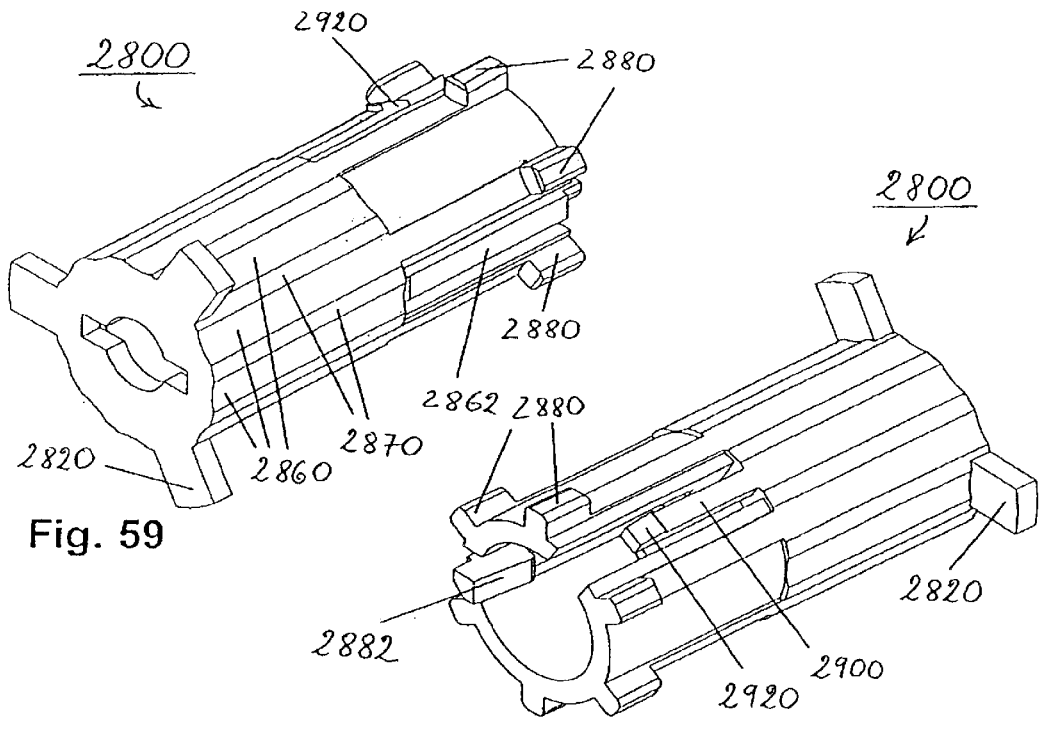
Fig. 59
Fig. 60
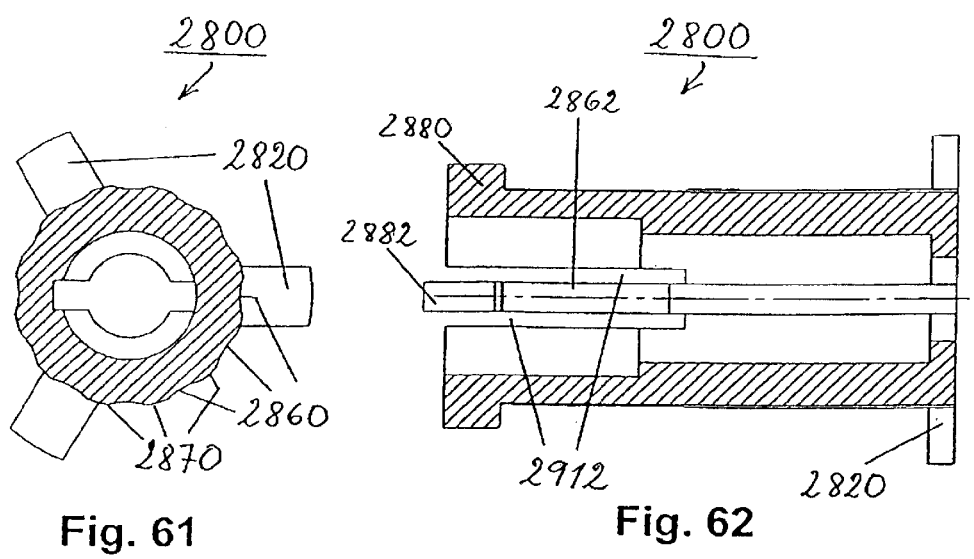
Fig. 61
Fig. 62

SELF-LOCKING SCREW CONNECTION

CROSS REFERENCES TO RELATED APPLICATIONS

This application is a divisional application of U.S. patent application Ser. No. 10/228,118 filed on Aug. 26, 2002 now U.S. Pat. No. 6,764,351 which claims the priority benefit of European Patent Application No. EP 01 120 439.3 and German Utility Model Application Nos. DE 201 14 120.5 and DE 201 14 103.5, all filed on Aug. 27, 2001.

STATEMENT REGARDING FEDERALLY SPONSORED RESEARCH

Not Applicable

BACKGROUND OF THE INVENTION

The invention relates to self-locking screw connection suitable for use with highly stressed electrical plug-type connectors for motor vehicles and the like, which serve for transmitting control signals and/or for power supply.

Standards in which important dimensions and codes for interchangeability are defined apply to plug-type connectors of this type. For example, a German standard for highly stressed two-pole to four-pole electrical connectors for road vehicles which contain round contacts and a bayonet coupling is DIN Standard 72585-1 and -2 of March, 1996. Seven-pole embodiments are also used. These connectors are intended for providing an electrical connection with components that are directly mounted on an internal combustion engine. Consequently, the connectors must be able to withstand high thermal and dynamic stresses. However, high stresses also occur when the connector is used on other fixed installations and with free-floating connectors within the line system or main system.

Primary and secondary locking elements are provided for the connector terminals in order to improve the reliability of the connector. Such secondary locking elements or retainers frequently have a complicated design and are difficult to insert.

SUMMARY OF THE INVENTION

An object of the present invention is to provide a self-locking screw connection suitable for use with an electrical connector designed according to DIN Standard 72585. The object of the present invention is solved by the subject matter of Claim 1. Advantageous further developments are defined in the dependent claims.

The electrical connector disclosed herein cannot only be handled much easier, but also provides significant technical advantages as described in greater detail below. The disclosed design of the electrical connector provides efficient use of material for manufacturing the components and thus allows an economic use of the materials.

In contrast to conventional designs in which the secondary locking element is inserted from the terminal receiving end of the housing corresponding to the side of the housing where the connecting leads protrude, the connector disclosed herein provides a connector housing in such a manner that the secondary locking element can be inserted from the opposite mating end of the housing. This simplifies and accelerates the assembly because it is no longer required to thread the connecting leads through the secondary locking element. Until now, the secondary locking element was commonly inserted from the terminal receiving end and locked in position after the housing was equipped with the terminals provided with the leads. An insertion chamber for receiving the secondary locking element, in combination with openings in the terminal receiving cavity walls, allows insertion of the secondary locking element with one hand from the mating end of the housing that is free of leads and to lock the terminals therein by means of "secondary interlocking," namely with the aid of locking knobs or lugs that protrude through said openings.

It is preferred that the secondary locking element can be inserted in an angular position relative to the housing in which the secondary locking element is located in a non-locking position. In this non-locking position, the terminal receiving cavities can be equipped with the terminals from the terminal receiving end of the housing without being obstructed by the locking knobs. The terminals are then retained in the terminal receiving cavities by means of "primary locking". This provides the advantage that the secondary locking element can be inserted before the housing is equipped with the terminals and can subsequently be rotated into its locking position.

It is preferred that parts which prevent effecting a connection with an electrical connector counterpart are integrally formed on the secondary locking element. In the non-locking position, radially extending "cover blades" cover the mating side end of at least one terminal receiving cavity, preferably three terminal receiving cavities, such that the terminal receiving cavities can only be accessed from the mating end in said locking state. In an exclusively four-pole embodiment, it is possible to provide only a single cover blade. However, the number of cover blades needs to be chosen such that no more than one empty, not occupied cavity is exposed in the non-locking position. This additional further development relates, in particular, to a secondary locking element for a socket housing which is described further below.

Alternatively, coding and/or guide means which commonly are integrally formed on the housing are provided on the secondary locking element and said means being angularly offset relative to their normal intended position in the non-locking position of the secondary locking element. The angular offset is only removed when the secondary locking element is in the locking position and in this locking position a connection with the connector counterpart can be effected. This additional feature relates, in particular, to a secondary locking element for a pin housing that is described further below. In the non-locking position, the secondary locking element is secured from falling out of the housing by a catch tab.

The handling and the assembly of a connector system are additionally simplified due to a special design of a coupling ring that can be snapped into an angular position which exactly defines the mating position or so-called zero position in which the electrical connector can be electrically connected to an electrical connector counter part.

A through-opening in the coupling ring which accommodates a firmly fitted safety pin with a predetermined breaking point can be used as an alternative to the commonly used system with complicated and hardly manipulation-proof lead sealings with a lead wire and lead eyelets. This advantageous further development also represents an independent solution for increasing the safety against manipulations on connectors with a coupling ring in general, which can be easily handled (without tools or assembly aids). If tensile or torsional forces are exerted upon the safety pin, fracturing or shearing occurs at the predetermined breaking point such that a manipulation can be easily detected.

As disclosed herein, the handling of electrical connectors to be mounted is significantly improved due to an elastically deformable self-locking snap-on nut. The self-locking nut does not have to be screwed over all thread turns of an outer thread until it is in the tightened position, but can be snapped onto the outer thread into a lowest position in a click-stop manner and can subsequently be tightened.

Threadless chambers of the outside thread and resiliently and integrally formed-on or molded-on thread segments of the self-locking nut are provided for achieving a self-locking effect. The handling also becomes easier and more reliable by providing an inclined starting surface at the leading end and a stopping edge at the trailing end of the thread segments of the nut as defined in corresponding dependent claims.

In contrast to conventional nuts, the inside diameter of the self-locking nut disclosed herein is, in the preferred embodiment, smaller than the nominal size or dimension of the thread. This is achieved by offsetting the thread segments radially inwardly relative to the nominal thread size. When the nut is screwed on, the self-locking effect is achieved due to the fact that a thread segment engages or immerses into one of the aforementioned threadless chambers. The curvature radius of the thread segments of the self-locking nut preferably is identical to the curvature radius of the mating thread, in this case, the threaded section of the connector housing.

The self-locking effect may, according to an alternative embodiment, also be achieved by providing the self-locking nut with a slightly smaller thread size than that of the mating thread. However, this has the disadvantage, in particular, with smaller thread sizes, that the handling becomes more complicated. In certain instances, it may even become impossible to screw on the nut.

An end cap that can be mounted on a cylindrical end section of the housing comprises a specially designed tension relieving device for an electric cable. The tension relieving device for an electric cable is independent of its application. Hence, the cap or parts of the cap are only an example of any suitable mounting or installation base or component.

The tension relieving device comprises two symmetrical, elastically flexible clamping members in the form of webs, ribs or fins that extend transversely and are obliquely inclined opposite to the direction of the tensile force, i.e. with respect to the longitudinal direction or axis of the cable to be relieved. The clamping members or webs are preferably slotted like a comb. More particularly, each clamping member has a free end and a mounting or attachment portion that is integrally formed on a mounting base. Beginning from the end the clamping members are slotted in direction towards the mounting end. Preferably, the slots extend parallel to one another so that the comb teeth formed due to the slots also extend parallel to one another and are preferably in one plane. Due to this feature, the cables are secured against tensile forces more reliably than it is the case with conventional transverse ribs that extend vertically.

Cables of different diameters can be reliably held according to an additional further development in which one clamping web of the previously described type respectively is integrally formed in each of the two end cap parts. In this case, the clamping webs symmetrically oppose one another in the assembled end cap and preferably define a flat, lenticular free cross section. In this manner, the comb teeth of the slotted webs circumferentially surround the cable. The short axis of this cross section corresponds to the minimum diameter of cables that can be held in position, with the long axis corresponding to the maximum diameter.

As disclosed herein, an annular self-locking head section of an end cap part of the connector also ensures a simplified handling. The end cap part provided with the annular head section can be mounted on the housing before the housing is equipped with the contacts. This preassembly was impossible in conventional solutions with hinged end cap parts, namely because these end cap parts can only be attached after the housing has been equipped with terminals and cables. This aspect of the invention advantageously can be generally applied to connectors with an end cap, i.e. it can be practiced independent of the connector disclosed herein.

The head section preferably contains elastically deformable catch blades that have the shape of ring segments. According to a further development, the mounted head section is secured by means of a safety pin.

BRIEF DESCRIPTION OF THE DRAWINGS

The invention is described in greater detail below with reference to preferred embodiments and drawings in which:

FIG. 1 is an exploded view of a four-pole pin connector with a self-locking nut and a secondary locking element;

FIG. 2 is a side view of a four-pole pin housing of the pin connector according to FIG. 1;

FIG. 5 is another cross section through the pin housing along the line 5—5 in FIG. 2;

FIG. 6 is a perspective representation of the secondary locking element for the four-pole pin connector according to FIG. 1;

FIG. 7 is a bottom view of the secondary locking element of the pin according to FIG. 6;

FIG. 8 is a longitudinal section through the secondary locking element of the pin along the line 8—8 in FIG. 7;

FIG. 9 is another longitudinal section through the secondary locking element of the pin along the line 9—9 in FIG. 7;

FIG. 12 is an exploded view of a four-pole socket connector with the coupling ring, the secondary locking element and the safety pin;

FIG. 13 is a top view of the four-pole socket housing of the socket connector according to FIG. 12;

FIG. 14 is a side view of the socket housing according to FIG. 13;

FIG. 15 is a longitudinal section through the socket housing along the line 15—15 in FIG. 13;

FIG. 29 is a perspective representation of the pin connector according to FIG. 1 and the matching socket connector according to FIG. 12 with attached coupling ring, namely in a position in which both connectors are aligned such that they can be connected to one another;

FIG. 30 is a representation of the two connectors which is comparable to that shown in FIG. 29, namely in an initial phase of the connecting process in which the two connectors can no longer be rotated relative to one another and the coupling ring of the socket connector is slightly pushed onto the housing of the pin connector;

FIG. 31 is a representation of the two connectors which is comparable to those shown in FIGS. 29 and 30, namely in a position in which the two connectors are completely inserted into one another and the safety pin shown in FIG. 27 can be installed, wherein this position is reached after rotating the coupling ring about the connector housing in the direction of an arrow shown in FIG. 30;

FIG. 53 is a perspective representation of a secondary locking element of the pin for the seven-pole pin housing according to FIG. 49;

FIG. 54 is a perspective representation of the secondary locking element of the pin according to FIG. 53 from a different viewing angle;

FIG. 55 is a longitudinal section through the secondary locking element of the pin according to FIG. 53;

FIG. 56 is a perspective representation of a seven-pole socket housing that matches the seven-pole pin housing according to FIG. 49;

FIG. 57 is a perspective representation of the socket housing according to FIG. 56 from a different viewing angle;

FIG. 58 is a longitudinally sectioned perspective representation of the socket housing according to FIG. 56;

FIG. 59 is a perspective representation of a secondary locking element of the socket for the seven-pole socket housing according to FIG. 56;

FIG. 60 is a perspective representation of the secondary locking element of the socket according to FIG. 59 from a different viewing angle;

FIG. 61 is a cross section through the secondary locking element of the socket according to FIG. 59, and FIG. 62 is a longitudinal section through the secondary locking element of the socket according to FIG. 59.

DETAILED DESCRIPTION OF THE PREFERRED EMBODIMENTS

Figure 3:
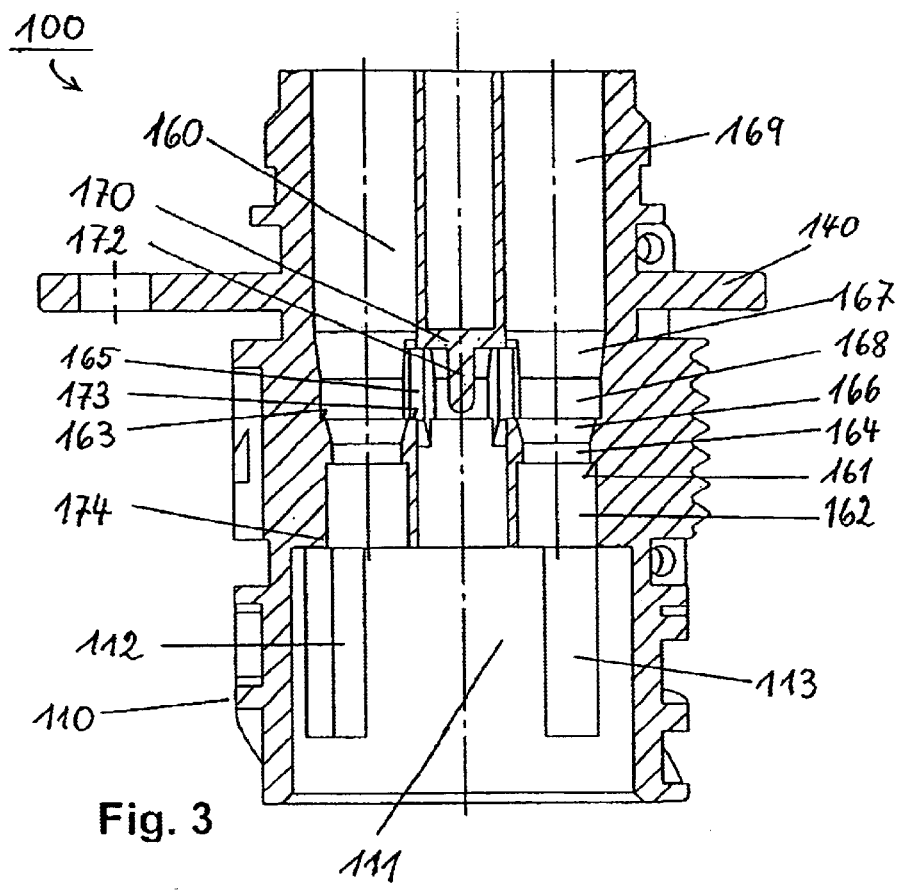
FIG. 3 is a longitudinal section through the pin housing along line 3—3 in FIG. 2.

FIGS. 1–11 show a plug-type electrical connector in the form of a four-pole pin connector. FIG. 1, in particular, shows that the connector consists of a pin housing 100, a maximum of four pin terminals or pin terminals or contact pins 195, of which only two are shown in FIG. 1, and a secondary locking element 180. The embodiment shown relates to a so-called fixed connector that, for example, can be flanged onto a not-shown mounting plate. For this purpose, a flange 140 with three fastening sections 142 is integrally formed on the pin housing 100, with a self-locking nut 300 also being provided. This self-locking nut is snapped onto a threaded section 130 of the pin housing 100 which borders on the flange 140 and can subsequently be tightened relative to a not-shown mounting plate situated between the flange 140 and the nut 300. The fastening sections 142 of the flange are not absolutely required.

FIGS. 1 and 2, in particular, show that the pin housing consists of several essentially cylindrical sections that are provided adjacent to on one another and fulfill different functions. A sleeve-shaped receiving section 110 is provided at the end of the pin housing 100 on the mating side. The outside of the receiving section 110 contains three grooves 116 that form part of a bayonet coupling. A lead sealing section 120 that is provided in the form of an annular groove 122 between the receiving section 110 and the aforementioned threaded section 130 is adjacent the receiving section 110. Three perforated lead sealing eyelets 124 are provided in the annular groove 122. The flange 140 is provided adjacent the threaded section 130. Another lead sealing section 121 that is also provided in the form of a circumferential annular groove 123 with perforated lead sealing eyelets 125 is arranged on the side of the flange 140 which lies opposite of the threaded section 130. A ring section 150 that is provided adjacent the lead sealing section 121 forms an end section of the pin housing 100 on the terminal receiving end thereof. The ring section 150 essentially consists of an annular web 156 and an annular groove 152 between the annular web 156 and the lead sealing section 121. Three catch tabs 154 that are circumferentially offset relative to one another are integrally formed in the annular groove 152. The ring section 150 serves for receiving the end of an end cap which faces the pin housing 100, with said end cap being described in greater detail below.

FIGS. 1, 3, 10 and 11, in particular, show that the inside circumference of the receiving section 110 defines an essentially cylindrical receiving opening 111 for receiving a matching section of a socket connector housing that is described further below. Adjacent to the receiving opening 111, four terminal receiving cavities 160 that are arranged in parallel to one another longitudinally extend through the pin housing 100, namely up to the end of the pin housing on the terminal receiving side. The terminal receiving cavities 160 are symmetrically arranged around the longitudinal axis of the pin housing. The outer side of the respective terminal receiving cavities 160 is connected to the inner side of the pin housing 100 by means of radially outward extending webs 174 (FIG. 4), one of which is integrally formed on each contact chamber.

Inside the pin housing 100, a transverse wall 170 is integrally formed at the outer side of the sleeve-shaped chambers 160 and the inner side of the pin housing 100 in a region between the threaded section 130 and the flange 140. In other words, the transverse wall 170 fills out or occupies the entire clear cross section of the pin housing in these regions in front of the flange, however, with the exception of the terminal receiving cavities that extend through the transverse wall. A longitudinally aligned central pin 172 that protrudes from the transverse wall 170 in direction of the receiving opening 111 is integrally formed on the transverse wall 170.

Figure 11:
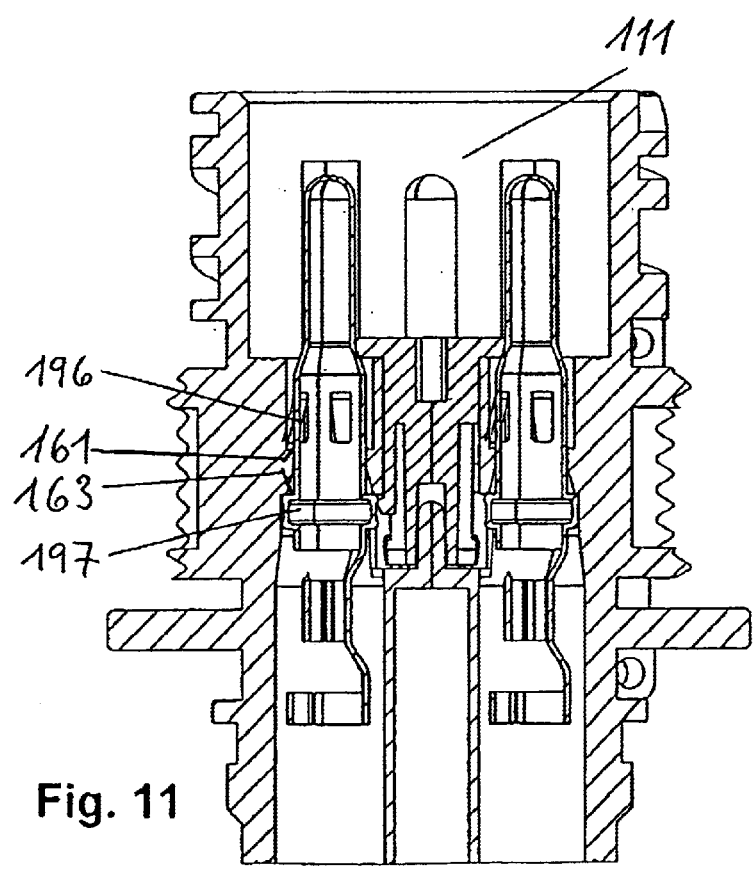
FIG. 11 is a longitudinal section through the pin connector according to FIG. 1 with inserted pin terminals and inserted secondary locking element in the non-locking state.

The inside contour of the terminal receiving cavities 160 changes in the longitudinal direction of the pin housing 100, namely such that a contact pin 195 that is inserted from the terminal receiving end is fixed in the terminal receiving cavity by means of a primary locking arrangement. For this purpose, the pin terminals 195 are provided in the form of round contacts which respectively comprise several locking tongues 196 that resiliently protrude outward, as well as a collar 197. FIG. 11, in particular, shows that the outer ends of the locking tongues 196 engage a shoulder 161 inside of the terminal receiving chamber 160 in the installed state of the pins, with the collar 197 being in contact with another shoulder 163. An installed contact pin is secured from being longitudinally displaced in the terminal receiving cavities in this manner.

Figure 4:
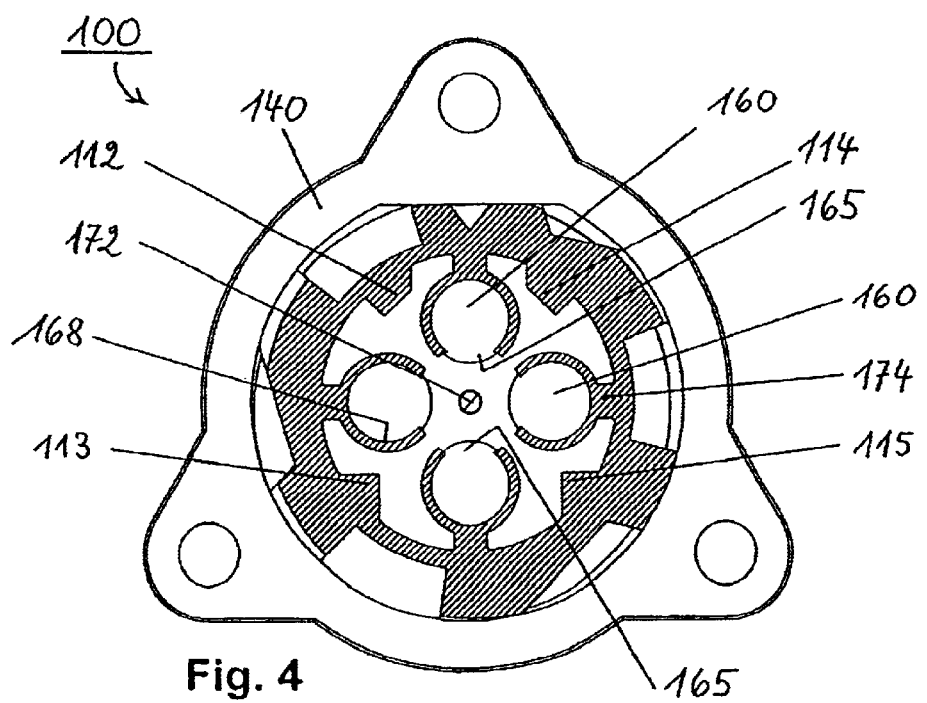
FIG. 4 is a cross section through the pin housing along line 4—4 in FIG. 2.

FIGS. 3 and 4 show that radially inwardly directed openings or slots 165 are arranged in the walls of the terminal receiving cavities 160 between the transverse wall 170 and the shoulder 163. FIG. 4, in particular, shows that the openings 165 extend over an angle of almost 90° relative to the central axis of the terminal receiving cavities 160. The openings 165 provide a shoulder 173 that is provided adjacent to the shoulder 163 within the space between the terminal receiving cavities 160. In other words, the shoulders 163 and 173 are located at the same point along the longitudinal axis, namely in the approximate center of the threaded section 130.

Figure 10:
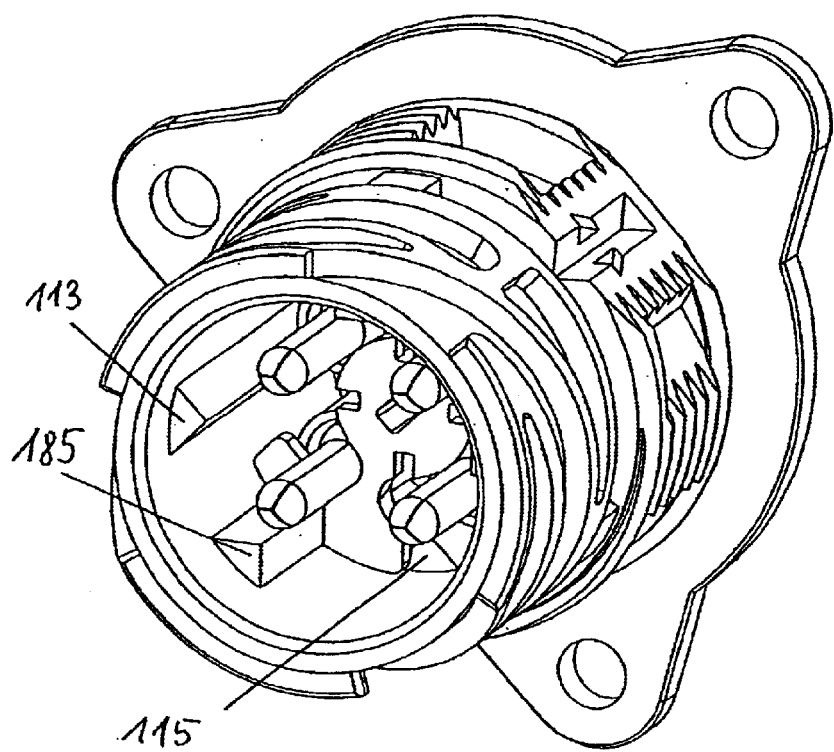
FIG. 10 is a perspective representation of the pin connector according to FIG. 1 with inserted pin terminals and an inserted secondary locking element in the non-locking state.

FIGS. 1, 3, 4 and 5 show that two coding ribs or strips 112 and 114 and two guiding ribs or strips 113 and 115 are integrally formed on the inside of the pin housing 100, wherein said ribs extend in the longitudinal direction of the pin housing 100 from the transverse wall 170 up to almost the end of the receiving opening 111 on the mating side. However, this does not apply to the guiding rib 115 which does not extend into the receiving opening 111, but only as far as the terminal receiving cavities 160 (FIG. 10). As described in greater detail below, a guiding rib 185 which is integrally formed on the secondary locking element 180 takes over the function of the guiding rib 115 in the receiving opening 111 when the secondary locking element 180 is inserted into the pin housing 100 and located therein in the locking position. Different arrangements of the coding ribs 112 and 114 conventionally serve for coding different contact pin or pin terminal installations in accordance with DIN 72585.

The outside contour of the four terminal receiving cavities 160 circumscribes a chamber between the transverse wall 170 and its end on the mating side. The secondary locking element 180 can be inserted into this chamber from the end of the pin housing 100 on the mating side and rotated about its longitudinal axis such that it clicks in position. The secondary locking element 180 effects a secondary locking of the pin terminals 195 inserted into the terminal receiving cavities 160 of the pin housing 100 in addition to the previously described primary locking effect.

FIGS. 1, 6, 7, 8 and 9, in particular, show that the secondary locking element 180 consists of an essentially cylindrical, profiled insertion body, on one end of which a disk-shaped blocking flange 182 is integrally formed. The blocking flange 182 is provided in a radial plane that extends perpendicular to the longitudinal axis of the insertion body. The blocking flange 182 is connected to a section 183 of the secondary locking element 180 which has the shape of a segment of an arc by means of a narrow web 181 that extends radially outwardly. The web 181 and the segment-shaped section 183 are located in the same plane as the disk-shaped blocking flange 182 (FIG. 6). On its side that faces away from the insertion body, the segment-shaped section 183 carries the above-mentioned guiding ribs 185 which essentially extends in parallel to the longitudinal axis of the profiled insertion body.

The insertion body of the secondary locking element 180 comprises a click-stop section 184 that adjoins the disk-shaped blocking flange 182. The click-stop section 184 comprises eight longitudinal depressions 186 that are respectively offset relative to one another by 45° and are formed on the circumference of said click-stop section. These longitudinal depressions extend parallel to the longitudinal axis of the insertion body and approximately have a hollow profile in the shape of a circular arc. A longitudinal hump 187 that is slightly curved outwardly is respectively formed between each one of the longitudinal depressions 186. This means that the click-stop section 184 has, if viewed in cross section, a slightly undulated profile with eight depressions that correspond to the longitudinal depressions 186 and eight elevations that correspond to the longitudinal humps 187 (FIG. 7).

A further section that, if viewed in cross section, has a cruciform profile located adjacent to the click-stop section 184. The cruciform profile is achieved due to the fact that, with the exception of a cylindrical core that has a smaller diameter than the average diameter of the click-stop section 184, only the material of every second longitudinal depression 186 is preserved in the form of four longitudinal ribs that are circumferentially offset relative to one another by 90°. On the end that faces away from the click-stop section 184, a locking knob or lug 188 that protrudes radially outwardly is integrally formed on each longitudinal rib. In addition, a central guide opening 189 is provided in the secondary locking element 180 on the end that is provided with the locking knobs 188. A resilient tongue 190 is integrally formed in a recess 191 between two adjacent longitudinal ribs, wherein said tongue extends in the longitudinal direction of the secondary locking element 180, namely from the click-stop section 184 into the recess 191, in a cantilevered manner (FIG. 9). The tongue comprises a holding hook 192 that extends radially outwardly on its free end. A central opening 194 that has the shape of a slot and serves for inserting a not-shown tool is provided at the end of the profiled insertion body on the blocking flange side.

When assembling the pin connector, the secondary locking element 180 is initially inserted into the insertion chamber between the terminal receiving cavities 160 of the pin housing 100 such that its end on the locking knob side (at 188) is the leading end during insertion. Element 180 is inserted to such a depth that the disk-shaped blocking flange 182 adjoins the terminal receiving cavities 160 and the holding hook 192 enters the opening 165 of the terminal receiving chamber 160 and engages behind the shoulder 173. The holding hook 192 that is integrally formed on the resilient tongue 190, in combination with the shoulder 173, prevents the secondary locking element 180 from unintentionally falling out when it is initially inserted into the pin housing 100.

During the initial phase of this inserting process, the guide pin 172 on the transverse wall 170 of the pin housing 100 engages into the guide opening 189 of the secondary locking element 180. Due to the outside contour of the terminal receiving cavities 160 and the outside contour of the profiled insertion body of the secondary locking element 180, the initial insertion of the secondary locking element 180 is only possible in an angular position in which the locking knobs 188 are rotated by 45° relative to the central longitudinal axes of the terminal receiving cavities 160 about the common longitudinal axis of the pin housing 100 and the secondary locking element 180. This means that the locking knobs 188 are respectively arranged between two adjacent terminal receiving cavities 160 while the angular position of the holding hook 192 is aligned with one of the terminal receiving cavities 160 such that the holding hook is able to engage or grip behind the shoulder 173. FIG. 10 also shows that, in the initially inserted state, the guiding rib 185 of the secondary locking element 180 is offset by 45° relative to the guiding rib 115 in the direction of the guiding rib 113 which is, as well as guiding rib 115, integrally formed onto the pin housing.

The secondary locking element 180 being inserted into the pin housing 100 is retained in the initial angular insertion position due to the fact that the terminal receiving cavities 160 engage into the longitudinal depressions 186 of the secondary locking element 180 which are located between the locking knobs 188. This engagement is effected such that the outside wall sections of the cavities 160, which are located opposite of the click-stop section 184 of the secondary locking element 180 engage into said depressions.

The disk-shaped blocking flange 182, the bridge-shaped web 181 and the section 183 in the form of an arc segment have such dimensions that, as shown in FIG. 10, in the initial insertion state of the secondary locking element 180 into the pin housing 100, the terminal receiving cavities 160 can be provided with the pin terminals 195 which are locked in the terminal receiving cavities 160 by primary locking means. After the terminal receiving cavities are equipped with the pin terminals as shown in FIG. 10, the secondary locking element 180 is rotated from its initial position into a position in which the guiding rib 185 is aligned with the guiding rib 115 and the locking knobs 188 protrude into the openings 165 of the terminal receiving cavities 160 and grip behind the collars 197 of the pin terminals 195. This is achieved by rotating the secondary locking element by 45° by means of a tool inserted into the actuating opening 194, for example, a screwdriver. FIG. 11 shows this locking position in which the pin terminals 195 are not only retained in the pin housing 100 by means of a primary locking means, but also by a secondary locking effect achieved by means of the secondary locking element 180.

In the locking position, the secondary locking element 180 is engaged with the pin housing 100 due to the fact that the terminal receiving cavities 160 engage into the longitudinal depressions 186 that are aligned with the locking knobs 188, namely with their outer wall sections that are located opposite of the click-stop section 184. The secondary locking element 180 is rotated from the initial position or non-locking position according to FIG. 10 into the locking position according to FIG. 11 by exerting a corresponding force with the tool inserted into the actuating opening 194 such that the contact pressure of the longitudinal humps 187 which are curved radially outwardly and located between the longitudinal depressions 186 is overcome. In this case, the outside contours of the terminal receiving cavities 160 and the click-stop section 184 are adapted to one another in such a manner that, when turning the secondary locking element by means of the tool, the secondary locking element snaps from one stable snap position into the other stable snap position, i.e., from the non-locking position according to FIG. 10 into the locking position according to FIG. 11, and is clicked in a precisely defined angular position.

The width of the bridge-like web 181 between the disk-shaped blocking flange 182 and the section 183 in the form of an arc segment is chosen such that the rotation of the secondary locking element 180 is not impaired by the pin terminals 195 protruding into the receiving opening 111. In addition, the dimension of the segment-shaped section 183 in the circumferential direction is chosen such that the secondary locking element 180 can only be inserted into the pin housing 100 in an angular position in which the guiding rib 185 is situated in the region of its associated guiding rib 115.

FIG. 12 shows a socket connector that matches the pin connector according to FIG. 1. The socket connector shown essentially consists of a socket housing 200, a secondary locking element 280 and socket terminals 295. The socket connector also comprises a coupling ring 400 that forms part of a bayonet coupling and an optional safety pin 490. The socket connector consisting of the socket housing 200, the secondary locking element 280 and the socket terminals 295 is described in greater detail below with reference to FIGS. 13–25.

FIG. 14, in particular, shows that the socket housing 200 contains a plug-in section 210 that can be inserted into the receiving or mating opening 111 of the pin housing 100, an installation section 230 that is adjacent the plug-in section 210 and serves for guiding the mountable coupling ring 400 and an adjacent ring section 250 that corresponds to and has the same purpose as the ring section 150 of the pin housing 100.

FIGS. 12–15, in particular, show that the socket housing 200 consists of an essentially cylindrical profiled member. Coding grooves 212 and 214 and guiding grooves 213 and 215 which extend parallel to the longitudinal axis of the socket housing 200 are provided on the outer surface of the sleeve-shaped plug-in section 210. The position and shape of the two coding grooves 212 and 214 are complementarily matched to the coding ribs 112 and 114 of the pin housing 100. The position and shape of the guiding groove 213 are also provided such that they match those of the guiding rib 113 of the pin housing 100. Likewise, the shape of the guiding groove 215 is provided such that it matches that of the guiding rib 185 of the secondary locking element 180 of the pin housing. The guiding groove 215 assumes a position that corresponds to that of the guiding rib 185 when the secondary locking element 180 of the pin housing is located in the above-mentioned locking position.

The annular installation section 230 has a front guide shoulder 232 and a rear guide shoulder 234 for the mounted coupling ring 400. In addition, an arc-shaped recess 236 is provided in the installation section 230, which recess is open to the end on the mating side and provided with an integrally formed catch tab 238 (FIG. 13). The recess 236 is provided such that the installation section 230 can receive an arresting projection 438 (FIG. 12) arranged on the inner side of the mounted coupling ring 400. The catch tab 238 cooperates with the arresting or catch projection 438 of the coupling ring 400 and serves for releasably locking or retaining the coupling ring 400 on the socket housing 200 in an angular position in which the socket housing 200 with the coupling ring 400 can be coupled to the receiving section 110 of the pin housing 100. In this context, it should also be mentioned that the coupling ring 400 is not attached or mounted to the socket housing 200 from the terminal receiving end as one may assume from FIG. 12, but rather from the mating side.

Analogous to the ring section 150 of the pin housing 100, the ring section 250 serves for mounting an end cap that is described further below. For this purpose, the ring section contains an annular groove 252 with three locking or indexing teeth 254 that protrude radially outwardly and an annular shoulder, flange or web 256 that adjoins the annular groove 252 (FIG. 14).

Four parallel terminal receiving cavities 260 are symmetrically arranged around the longitudinal axis of the socket housing inside the socket housing 200. Each terminal receiving chamber 260 is integrally formed on the inner wall of the socket housing 200 by means of a respective web 274. The terminal receiving cavities 260 extend from the end on the mating side to the end of the socket housing 200 on the terminal receiving end and have a position which corresponds to that of the terminal receiving cavities 160 of the pin housing 100.

Figure 16:
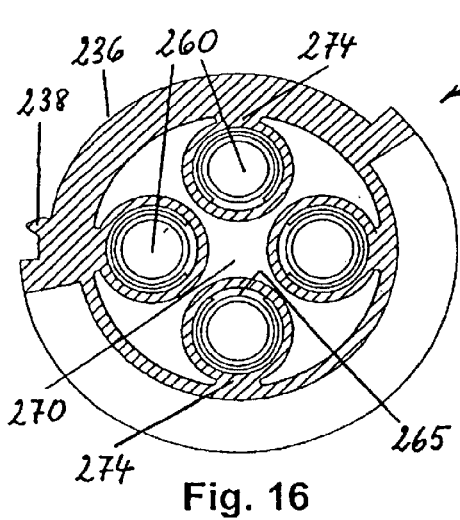
FIG. 16 is a cross section through the socket housing along the line 16—16 in FIG. 14.
Figure 17:
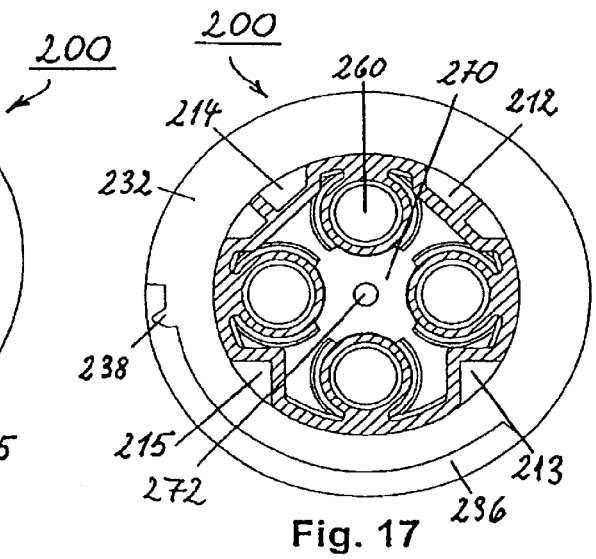
FIG. 17 is another cross section through the socket housing along the line 17—17 in FIG. 14.
Figure 18:
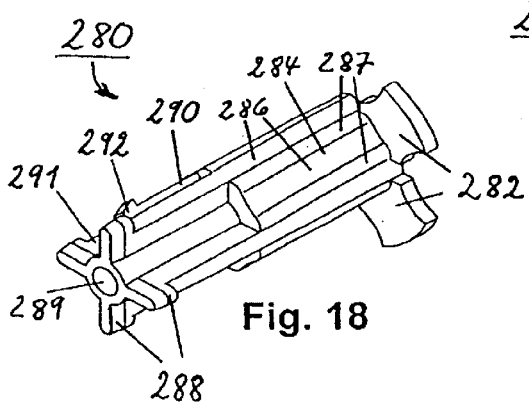
FIG. 18 is a perspective representation of the secondary locking element of the four-pole socket connector according to FIG. 12.

Analogous to the terminal receiving cavities 160, the terminal receiving cavities 260 have an inside contour with two shoulders 261 and 263 that serve for the primary locking of the socket terminals 295. A transverse wall 270 is integrally formed on the outer walls of the terminal receiving cavities 260 and on the inner wall of the socket housing 200 at the level of the installation section 230. The transverse wall 270 carries a longitudinally extending central guide pin 272 that protrudes from the transverse wall 270 in a direction towards the end of the socket housing 200 on the mating side. Radially inwardly directed openings 265 are provided in the walls of the terminal receiving cavities 260 between the transverse wall 270 and the shoulder 263. FIG. 16, in particular, shows that the openings 265 extend over an angle of almost 90° relative to the central axis of the terminal receiving cavities 260. The openings 265 provide a shoulder 273 that is adjacent to the shoulder 263 in the interspace between the terminal receiving cavities 260.

The secondary locking element 280 essentially consists of a cylindrical profiled body or member. FIGS. 18–21, in particular, show that the secondary locking element 280 comprises an essentially cylindrical snap- or click-stop section 284 on which eight longitudinally extending depressions 286 are provided. These longitudinal depressions are respectively separated from one another by a longitudinal hump 287. The eight longitudinal depressions 286 are circumferentially offset relative to one another by 45°.

Three blocking or cover blades 282 that protrude radially outwardly are integrally formed on the upper end of the click-stop or indexing section 284, with said cover blades being circumferentially offset relative to one another by 90°. The blocking or cover blades 282 are respectively aligned with one of the longitudinal depressions 286.

At its end opposite to the cover blades 282, the click-stop section 284 adjoins a section that, if viewed in cross section, has a cruciform profile. The cruciform profile is achieved due to the fact that, with the exception of a cylindrical core that has a smaller diameter than the average diameter of the click-stop section 284, only the material of every second longitudinal depression 286 is preserved in the form of four longitudinal ribs that are offset relative to one another by 90° and offset relative to the cover blades 282 by 45°. At the end of the secondary locking element 280 which is opposite to the locking blades 282, locking knobs 288 that protrude radially outwardly are integrally formed on these longitudinal ribs.

Figure 19:
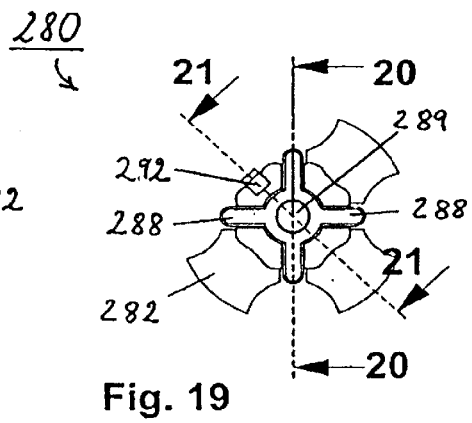
FIG. 19 is a bottom view of the secondary locking element of the socket according to FIG. 18.
Figure 20:
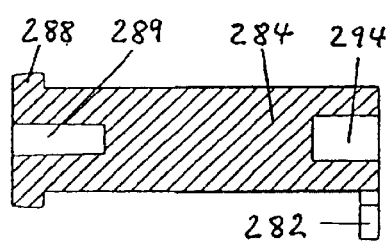
FIG. 20 is a longitudinal section through the secondary locking element of the socket along the line 20—20 in FIG. 19.
Figure 21:
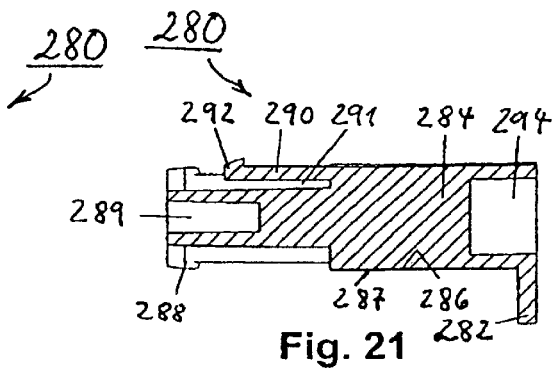
FIG. 21 is another longitudinal section through the secondary locking element of the socket along the line 21—21 in FIG. 19.

FIG. 19, in particular, shows that one depression of the eight longitudinal depressions 286 is neither angularly aligned with one of the locking knobs 288 nor one of the cover blades 282. In a recess 291 that is located between two adjacent longitudinal ribs that carry locking knobs 288, this longitudinal depression passes over into an elastic tongue 290 that extends in the longitudinal direction of the secondary locking element 280 and in a cantilevered fashion and comprises a holding tab 292 that protrudes radially outwardly from its free end. The tongue 290 is slightly shorter than the longitudinal ribs that carry the locking knobs 288.

At the end of the secondary locking element 280 which comprises the cover blades 282, a central opening 294 is provided for inserting a tool. At the opposite end on the side of the locking knobs, a central opening 289 is provided in the secondary locking element 280.

The previous description shows that the secondary locking element 280 of the socket housing essentially has the same design as the secondary locking element 180 of the pin housing. The cover or blocking blades 282 of the secondary locking element 280 correspond to the blocking flange 182 of the secondary locking element 180. Due to its use in a socket housing, the secondary locking element 280 does not contain parts that correspond to the parts 181, 183 and 185 of the secondary locking element 180.

Analogous to the pin terminals 195, the contact sockets or socket terminals 295 are round contacts and each socket terminal 295 also comprises several resilient locking tongues 296 that protrude radially outwardly and a projecting collar 297 (FIG. 12).

When assembling the socket connector, the secondary locking element 280 of the socket housing is initially inserted into the receiving chamber in the plug-in section 210 of the socket housing 200 in the mating direction such that the end (at 288) on the side of the locking knobs is the leading end during insertion. As already explained before, the receiving chamber is defined by the outer walls of the four terminal receiving cavities 260. The secondary locking element is inserted until the central guide pin 272 on the transverse wall 270 enters the central guide opening 289 of the secondary locking element 280 and the cover blades 282 of the secondary locking element 280 come in contact with the end of the terminal receiving cavities 260 on the mating side.

The outside contour of the terminal receiving cavities 260 and the outside contour of the secondary locking element 280 are adapted to one another in such a manner that the secondary locking element 280 can only be inserted in an angular position in which the locking knobs 288 are respectively located between two terminal receiving cavities 260 and the cover blades 282 are respectively aligned with one of the terminal receiving cavities 260. In this angular position during the initial insertion, the holding tab 292 is, relative to the longitudinal axis of the pin housing 200, angularly aligned with one of the terminal receiving cavities 260 such that the holding tab 292 snaps into the opening 265 of the corresponding terminal receiving chamber 260 and engages or grips behind the shoulder 273 in the inserted state. This causes the inserted secondary locking element 280 to be locked in the socket housing 200 such that it cannot unintentionally fall out.

The position of the secondary locking element 280 during the initial phase of the inserting process constitutes, with regard to the terminals, a non-locking position or state which makes it possible to insert the socket terminals 295 into the terminal receiving cavities 260 from the end of the socket housing 200 on the terminal receiving end. The terminals 295 inserted into the terminal receiving cavities 260 are retained in the terminal receiving cavities by means of a primary locking achieved due to a cooperation between the locking tongues 296 and the collar 297 with the shoulders 261 and 263.

Figures 22, 24:
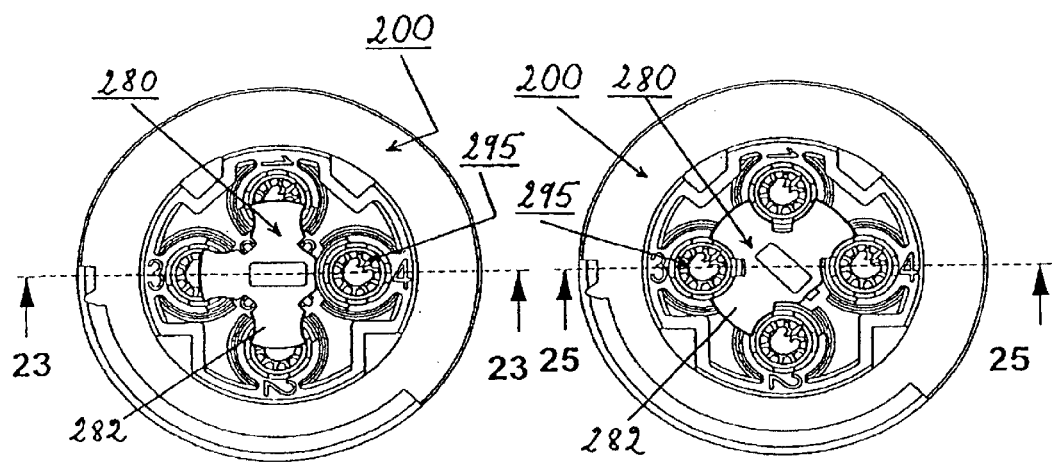
FIG. 22 is a top view of the socket connector according to FIG. 12 with inserted socket terminals and inserted secondary locking element in the non-locking state.
FIG. 24 is a top view of the socket connector according to FIG. 12 with inserted socket terminals and inserted secondary locking element in the locking state.
Figures 23, 25:
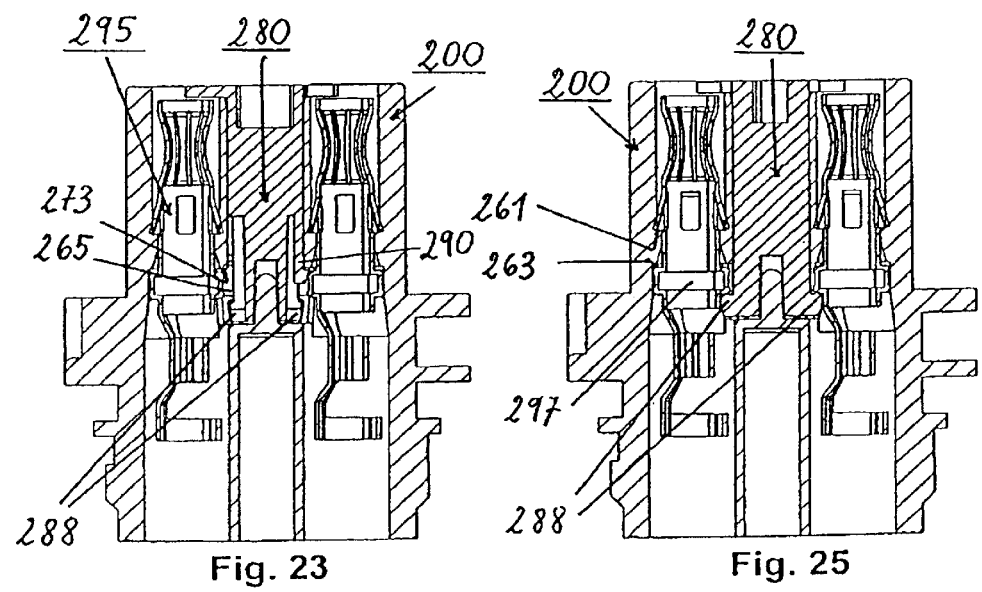
FIG. 23 is a longitudinal section through the socket connector according to FIG. 22.
FIG. 25 is a longitudinal section through the socket connector according to FIG. 24.

FIGS. 22 and 23 show the position of the secondary locking element 280 within the socket housing 200 (already provided with the socket terminals 295) during the initial phase of the inserting or plug-in process in which the secondary locking element 280 is, with regard to the socket terminals 295, aligned in a non-locking position. In this position, the circumferential walls of the terminal receiving cavities 260 engage into those walls of the longitudinal depressions 286 that are not aligned with the locking knobs 288 and releasably lock or retain the secondary locking element 280 with respect to rotation about its longitudinal axis. In addition, the cover blades 282 cover the ends of the terminal receiving cavities 280 on the mating side in the non-locking position and thus prevent a connection with the pin housing 100.

After the terminal receiving cavities 260 are provided with the socket terminals 295, the secondary locking element 280 is rotated about its longitudinal axis by means of a tool inserted into the actuating opening 294, preferably a screwdriver. The secondary locking element 280 is rotated until the outer walls of the terminal receiving cavities 260 engage those walls of the longitudinal depressions 286 that are aligned with the locking knobs 288. In this case, the secondary locking element 280 is rotated in a click-stop action by 45° from a non-locking position into a locking position. In the locking position, the locking knobs 288 protrude through the openings 265 and engage or grip behind the collars 297 of the socket terminals 295.

FIGS. 24 and 25 show the locking position of the secondary locking element 280 within the socket housing 200 that has been provided with terminals 295. In this locking position, the socket terminals 295 are not only secured by means of the primary locking, but also by means of a secondary locking effect, wherein the secondary locking element 280 is also locked such that it cannot be displaced in the longitudinal direction. The cover blades 282 are designed in such a manner that they expose the sockets of the socket terminals 295 in the locking position in order enable insertion of the pin terminals 195 of the pin connector. However, the cover blades are still in contact with the ends of the terminal receiving cavities 260 on the mating side.

Figure 26:
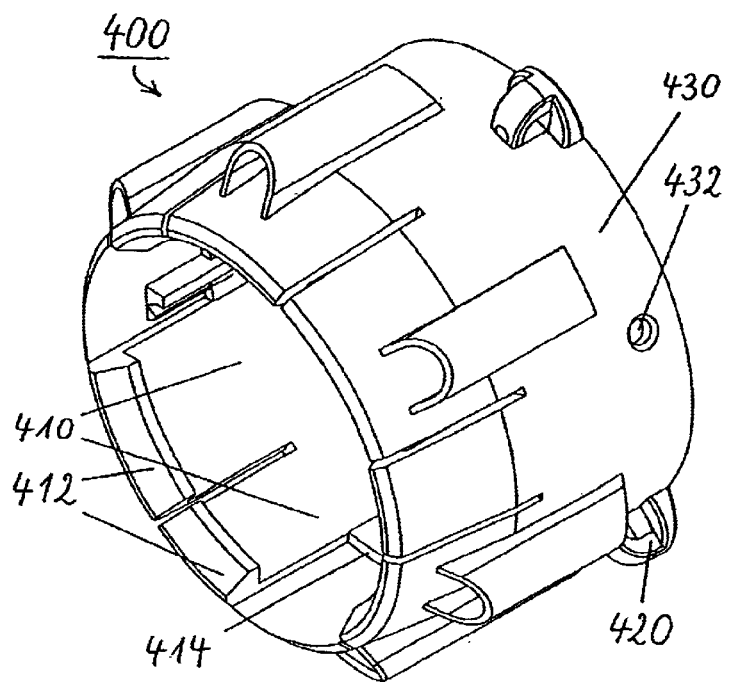
FIG. 26 is a perspective representation of the coupling ring shown in FIG. 12 from a different viewing angle.

FIGS. 12 and 26 show that the coupling ring 400 essentially consists of an annular element 430, the outer surface of which comprises three perforated lead sealing eyelets 420 that are uniformly and circumferentially spaced at the end of the ring on the mating side. Ring element 430, on its end opposite to the mating side, is subdivided into several ring segments 410 by means of longitudinal slots. These ring segments are resilient due to the aforementioned subdivision and a reduction in the wall thickness.

A locking section 412 that protrudes radially inwardly is integrally formed on the free end of several ring segments 410, wherein said locking section extends along the ring segment 410 in the circumferential direction and has a wedge-shaped-profile if viewed in longitudinal section. Other ring segments 410 comprise an annular shoulder 414 that protrudes radially inwardly in a portion of the segments outside their free end.

In the state in which the coupling ring 400 is attached to the socket housing 200, the locking sections 412 of the coupling ring 400 engage behind the rear guide shoulder 234 of the installation section 230 of the socket housing 200, and the shoulders 414 of the coupling ring 400 engage behind the front guide shoulder 232 of the installation section 230. In this attached state, the coupling ring 430 can no longer be displaced on the socket housing 200 in its longitudinal direction. However, it is possible to rotate the coupling ring on the socket housing 200 about its longitudinal axis over a predetermined angular range.

FIGS. 29–31 show how the pin housing 100 and the socket housing 200 are connected to one another by means of the coupling ring 400 attached to the socket housing 200. In order to render the connecting process more easy, a clearly visible arrow 131 is arranged in the threaded section 130 of the pin housing 100. A manually sensible longitudinal rib 440 with a clearly visible longitudinal line 441 is arranged on the outer circumference of the coupling ring 400.

In the coupling position, the coupling ring 400 attached to the socket housing 200 is rotated opposite to an arrow shown in FIG. 30 until it reaches the locking position in which the catch tab 438 of the coupling ring 400 which protrudes into the recess 236 of the installation section 230 of the socket housing 200 has been rotated into a position over the catch tab 238 into a narrow click-stop section 239 (FIG. 13). The click-stop section 239 is limited by the catch tab 238 on one side and by one end of the recess 236 on the other side. If the longitudinal line 441 on the longitudinal rib 440 is aligned with the arrow 131 on the threaded section 130 of the pin housing 100 in this locking position of the coupling ring 400 as shown in FIG. 29, the socket housing 200 and the pin housing 100 can be inserted into one another over a certain extent as shown in FIG. 30. Locking pins 436 (FIG. 12) that are integrally formed on the inner circumference of the coupling ring 400 protrude into an entrance or forward section of the grooves 116.

In the initial inserting position shown in FIG. 30, the guiding and coding ribs of the pin housing 100 already protrude slightly into the coding and guiding grooves of the socket housing 200 such that the socket housing 200 can no longer be rotated relative to the pin housing 100. Analogously, the pins of the pin terminals 195 already protrude slightly into the sockets of the socket terminals 295. In order to completely insert the pin housing 100 into the socket housing 200, the coupling ring 400 is rotated in the direction of the arrow shown in FIG. 30 until the locking pins 436 are locked in the end section of the grooves 116.

Figure 27:
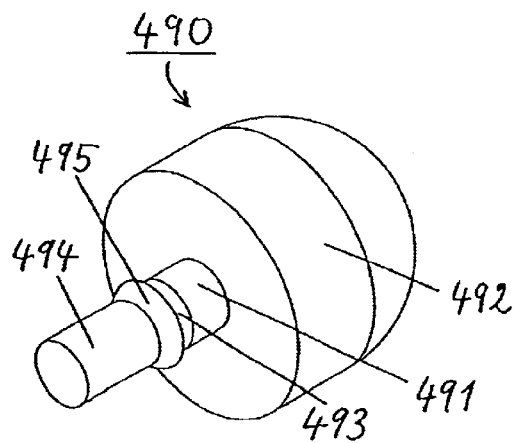
FIG. 27 is a perspective representation of the safety pin shown in FIG. 12 from a different viewing angle.

When turning the coupling ring 400 into the locked end position shown in FIG. 31, a through-opening 432 provided in the annular circumferential wall of the coupling ring 400 passes over a web 119 that adjoins the end section of the groove 116 and, in the locked position, is directly located above a framed recess 117 provided behind the web 119. This constructive design allows to insert a safety pin into the through-opening 432 of the coupling ring 400 from the outside so that the pin protrudes into the framed recess 117. An embodiment of a suitable safety pin 490 is shown in FIG. 27. The safety pin 490 comprises a head 492 and a plug-in section that is integrally formed thereon. This plug-in section consists of a section 491 provided adjacent to the head and an end section 494 that is located opposite to the head. A breaking point 493 and a collar 495 that is provided adjacent to the breaking point and adjacent to the end section 494, are provided between sections 491 and 494.

Figure 28:
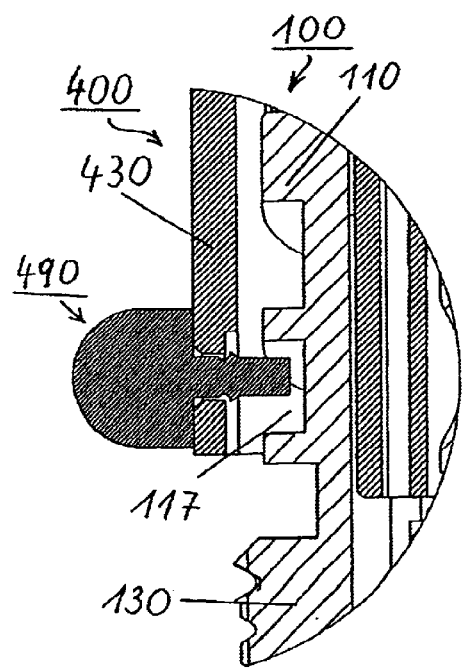
FIG. 28 is a longitudinal section through the safety pin according to FIG. 27 in the installed state.
Figure 32:
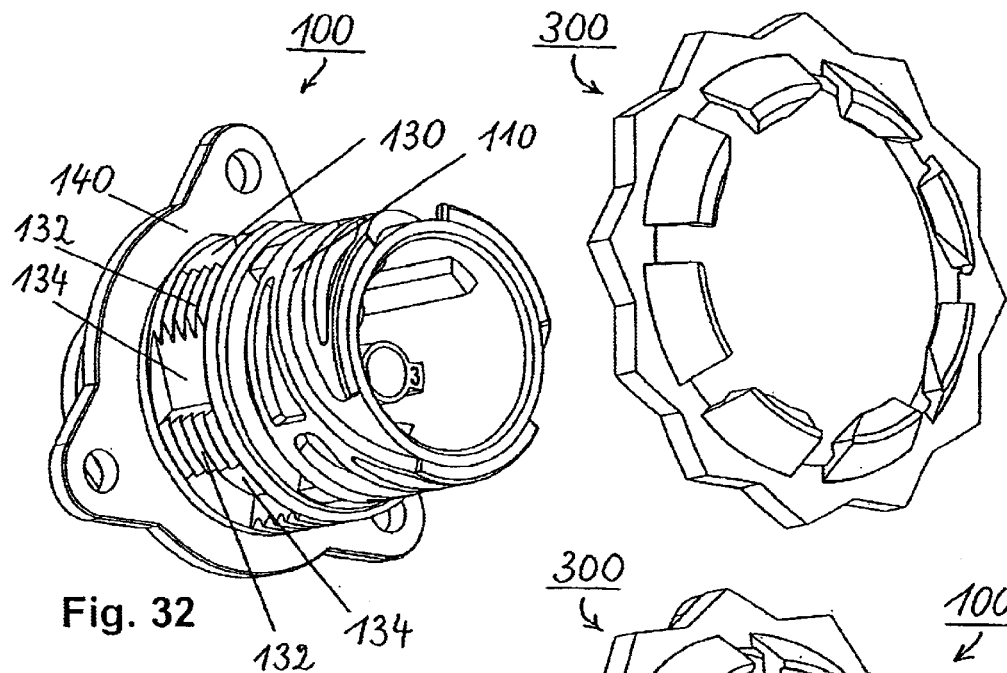
FIG. 32 is a perspective representation of the pin housing of the connector according to FIG. 1 and the matching self-locking nut.
Figure 33:
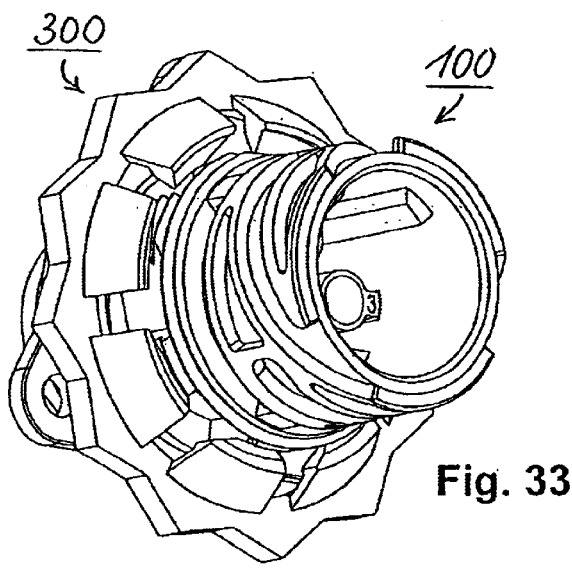
FIG. 33 is a representation that is comparable to that shown in FIG. 32, wherein the self-locking nut is snapped onto the threaded section of the pin housing.
Figure 34:
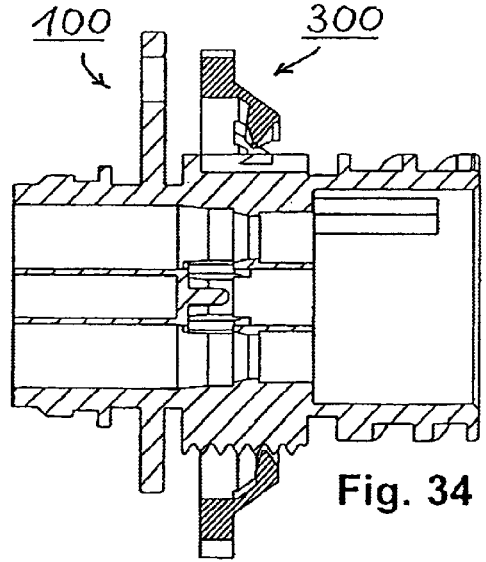
FIG. 34 is a longitudinal section through the pin housing according to FIG. 33 with attached self-locking nut.
Figure 35:
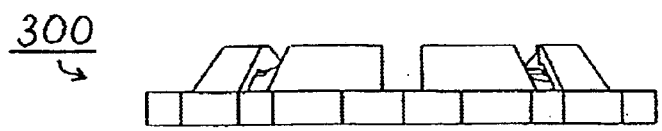
FIG. 35 is a schematic side view of the self-locking nut.
Figure 36:
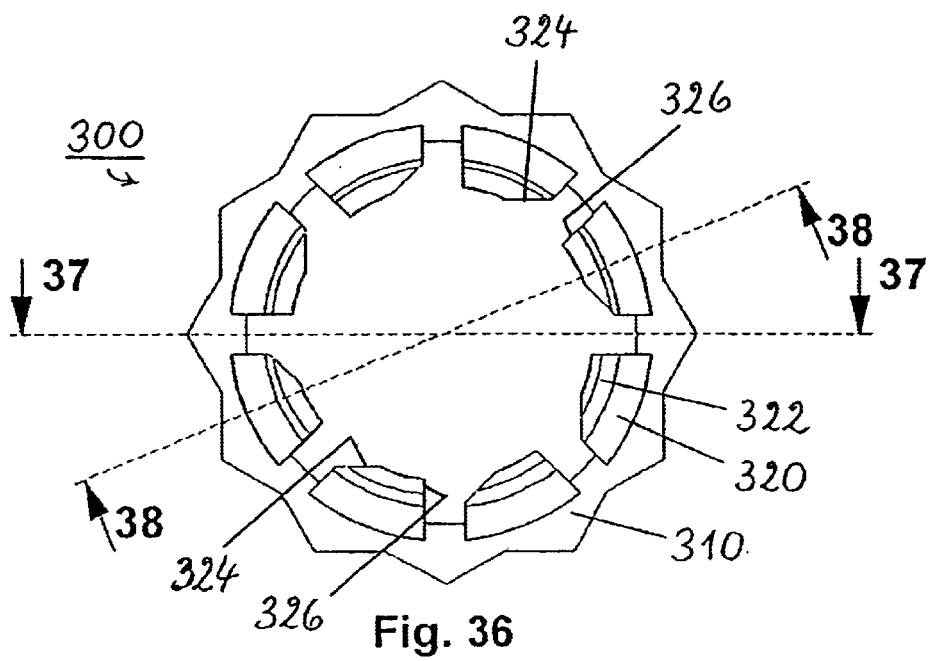
FIG. 36 is a schematic top view of the self-locking nut according to FIG. 35.
Figure 37:
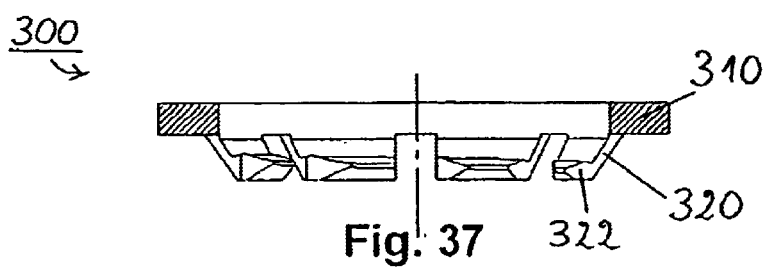
FIG. 37 is a cross section through the self-locking nut along the line 37—37 in FIG. 36.
Figure 38:
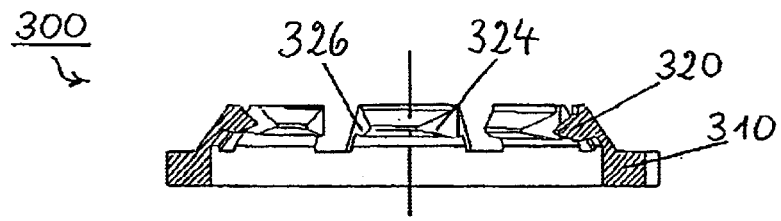
FIG. 38 is another cross section through the self-locking nut along the line 38—38 in FIG. 36.

FIG. 28 shows the safety function achieved by means of the safety pin 490 in the locked end position in which the head of the safety pin 490 firmly pressed into the through-opening 432 adjoins an annular element 430 of the coupling ring 400 and protrudes with its end section 494 into the recess 117 in section 110. The collar 495 ensures that the safety pin 490 inserted into the through-opening 432 can no longer be pulled out of this opening, but rather fractures at the breaking point 493 during such an attempt. The breaking point 493 also fractures when one tries to rotate the coupling ring 400 out of the locked end position in a direction opposite to the direction indicated by the arrow in FIG. 30, namely when the end section 494 is pressed against the web 119.

The design and the function of an embodiment of a self-locking nut connection is described in greater detail below with reference to FIGS. 32–38.

The threaded section 130 of the pin housing 100 which adjoins the flange 140 carries several turns of a single-thread external thread. The external thread is subdivided into several thread segments 132 that are spaced apart from one another in the circumferential direction. The thread segments 132 are separated by thread-free chambers 134 that are recessed into the material. Each one of the thread-free chambers extend over a partial circular arc in the circumferential direction.

The self-locking nut 300 which is schematically illustrated in FIGS. 35–38 consists of a support ring 310, on which a plurality of lamellas or blade-like sections 320 that are circumferentially spaced apart from one another are integrally formed on and raise upwardly and obliquely inwardly from the ring surface. On their free end, the blade-like sections 320, respectively, carry a thread segment 322 in the form of a partial circular arc. It is preferred that the thread segments 322 together form only one turn, or however, if so required, several turns of a single-thread internal thread.

Due to their geometry, the blade-like sections 320 are integrally formed on the support ring 310 in a resilient manner. However, the free ends of the blade-like sections 320 constituting the thread segments 322 are rigid. The support ring 310 represents the basic frame of the self-locking nut, with the design of the support ring 310 ensuring the required stability for the function of the self-locking nut. In other respects, the support ring 310 is designed in such a manner that it can, due to providing a good gripping surface, be easily tightened manually and/or with an auxiliary tool. The outside contour of the support ring can be adapted to the installation tool used. A ring wrench may be used for this purpose in the present embodiment.

Due to the resilient blade-like or strip-like sections 320, the self-locking nut 300 does not have to be rotated over all turns of the threaded section 130 of the pin housing 100 until it is tightened. It is possible to initially snap the self-locking nut 300 over the threaded section 130 until it reaches a position in which it abuts a mounting plate (not shown) between the flange 140 and the self-locking nut 300, with the self-locking nut subsequently being tightened either manually or with an auxiliary tool.

The resilient blade-like sections 320 also make it possible to select a thread diameter of the internal or inside thread defined by the thread segments 322 to be slightly smaller than the thread diameter of the external thread defined by the thread segments 132. If the self-locking nut has a slightly smaller thread diameter and if the angle and length of the circular arc sections defined by the thread segments 322 on the free ends of the blade-like sections 320 are properly defined relative to the angle and length of the circular arc sections defined by the thread segments 132 of the threaded section 130, the following can be achieved: one of the blade-like sections 320 and the thread segment 322 integrally formed thereon always engages into one of the thread-free chambers 134 of the threaded section 130 when the self-locking nut is tightened after having been snapped on.

In order to ensure that the self-locking nut can be tightened despite this engagement, the thread segments 322 of the self-locking nut 300 and/or the thread segments 132 of the threaded section 130 are provided with an inclined or slanting starting contact or butting surface. In the present embodiment, the thread segments 322 of the self-locking nut 300 have a slanted contact surface 324 or starting slope. Furthermore, the thread segments 322 of the self-locking nut

300 are provided with a defined stopping edge 326. This stopping edge, when rotating the self-locking nut in unscrewing direction, abuts the trailing edge of the thread-free chamber 134 into which the respective blade-like section 320 engages. This prevents the self-locking nut 300 from loosening or unscrewing itself so that a self-locking effect is achieved.

As described above, it is preferred that the thread diameter of the self-locking nut is not changed in comparison to that of the mating thread. The thread segments are instead offset radially inwardly by reducing the original setting angle of the flexible blade-like sections 320 relative to the horizontal line. Regarding a thread size M-26, a reduction in the clear diameter of the self-locking nut by, for example, 1 mm effects that the thread segments 322 immerse into the thread-free chambers 134 up to a position which is 0.5 mm deeper than the root of the mating thread.

In the present embodiment, three thread-free chambers 134 are provided in the threaded section 130, wherein said chambers are respectively offset relative to one another by 120°. The self-locking nut 300 comprises eight flexible blade-like sections 320 that are respectively offset relative to one another by 45°. This angular relationship between the blade-like sections 320 and the thread-free chambers 134 ensures that the self-locking nut is locked within 15° increments and is thus secured against unscrewing or loosening. If the thread pitch is 1.5 mm, this means that a graduation in increments of 0.06 mm is achieved in the longitudinal direction of the threaded connection. This allows a flexible mounting if the wall thickness of a mounting plate (not shown) varies.

Figure 45:
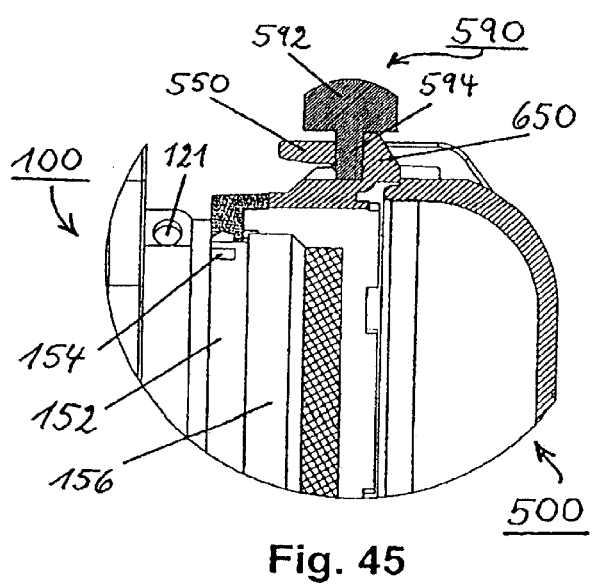
FIG. 45 is a longitudinal section through the safety pin according to FIG. 44 in the installed state.
Figure 46:
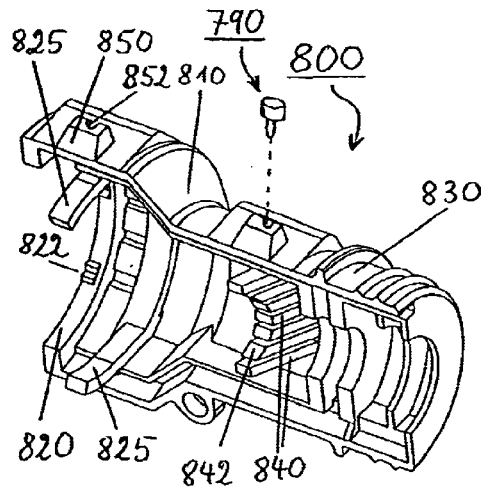
FIG. 46 is a perspective representation of a lower part of a straight end cap.
Figure 47:
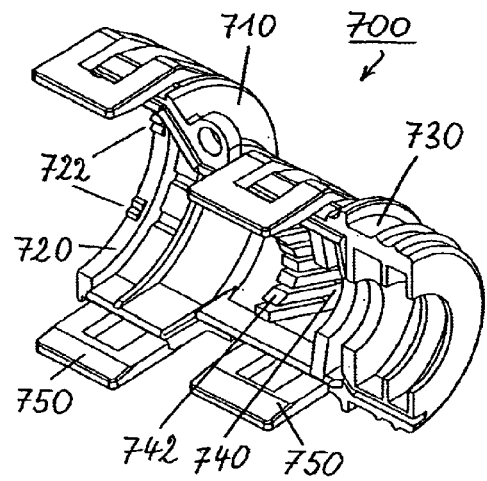
FIG. 47 is a perspective representation of an upper part of the straight end cap which matches the lower part according to FIG. 46.
Figure 48:
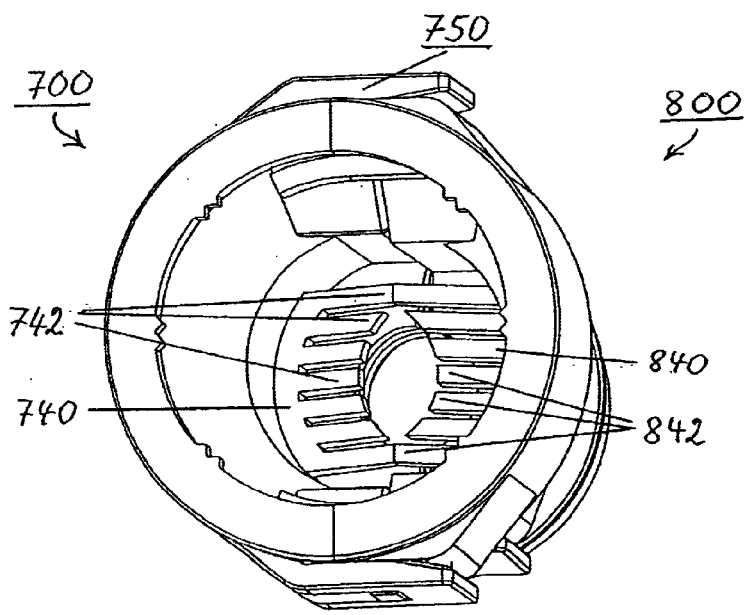
FIG. 48 is a perspective representation of the straight end cap consisting of the lower part according to FIG. 46 and the upper part according to FIG. 47.

FIGS. 39–45 show an embodiment of an angled end cap, with FIGS. 46–48 showing an embodiment of a straight end cap. The end caps serve for guiding and protecting the end of an electric cable connected to the plug-type connector and, in particular, for relieving the mechanical tension of the electrical conductors of the cable which are connected to the terminals. If so required, the end cap may also serve as a seal such that entry of moisture into the plug-type connector or the cable end connected to said connector is prevented.

Figure 39:
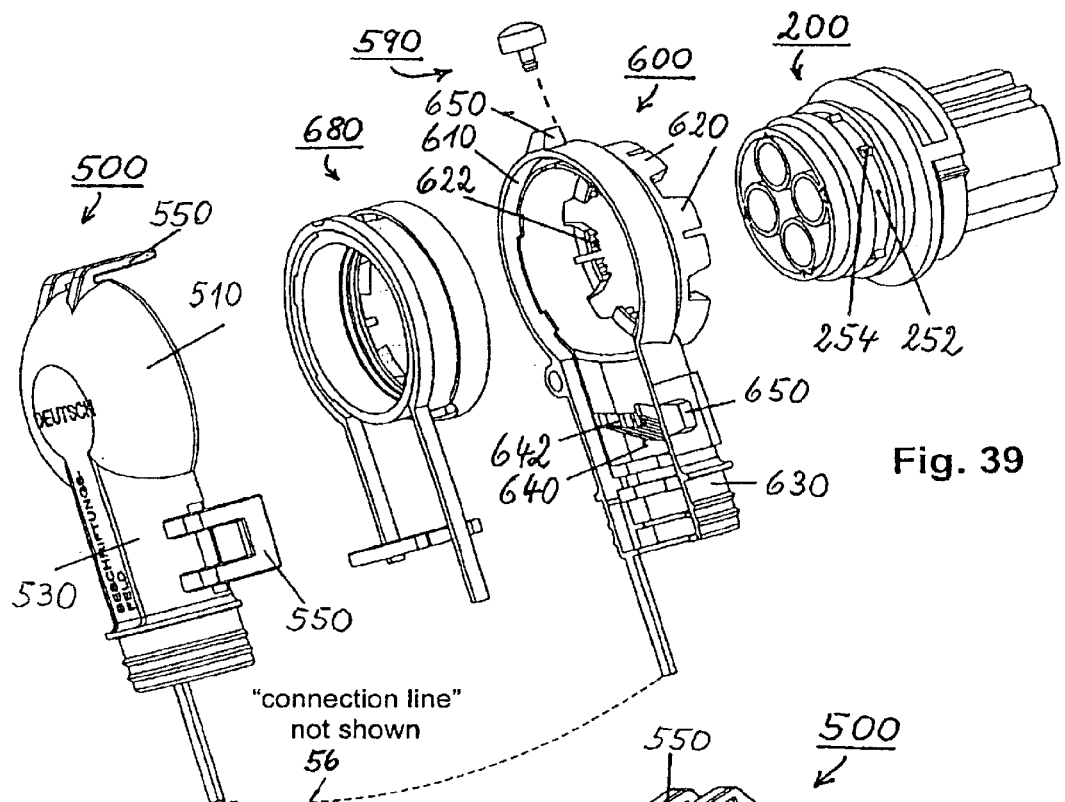
FIG. 39 is an exploded view of an angled end cap with safety pin and the matching socket housing for a sealable version.
Figure 40:
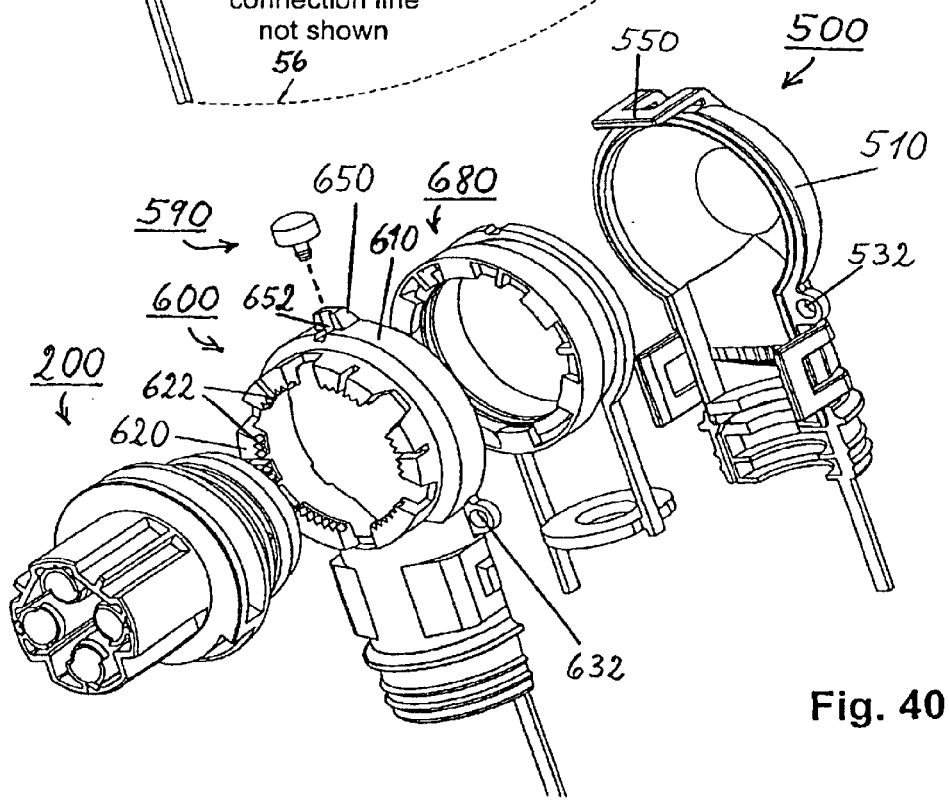
FIG. 40 is an exploded view of the angled end cap with safety pin and the socket housing according to FIG. 39 from a different viewing angle.

FIGS. 39 and 40, in particular, show the embodiment of a 90° end cap. The cap consists of two shell-shaped cap parts, namely a lower part 600 and an upper part 500. The lower part 600 has an annular head section 610 and an essentially hollow, semi-cylindrical longitudinal section 630 that is integrally formed on one side of the annular head section 610 and extends perpendicular to the central axis of the annular head section.

The upper part 500 has a head section 510 in the form of a round shell which fits on the annular head section 610 of the lower part 600, as well as an essentially hollow, semi-cylindrical longitudinal section 530 that is integrally formed on one side of the head section 510 and fits on the longitudinal section 630 of the lower part 600. If viewed in cross section, the longitudinal sections 530 and 630 of the lower part 600 and the upper part 500 essentially have a hollow, semi-cylindrical or groove-shaped profile.

The lower part 600 and the upper part 500 can be connected to one another in the assembled state. For this purpose, catch tabs 650 are integrally formed onto the lower part 600 and catch hooks 550 are integrally formed onto the upper part 500. Seals may be inserted or injected into hollow ribs or hollow webs of the upper part 500 and/or the lower part 600. Such a sealing element 680 for the lower part 600 is shown in FIGS. 39 and 40.

In the connected state, the space defined between the longitudinal sections 530 and 630 forms a guide channel for a cable (not shown) which extends in the longitudinal direction of the end cap. Within the space defined by the head sections 510 and 610, the guide channel passes over into an opening that extends transversely to the guide channel. The opening is limited by the annular head section 610, and serves for receiving the ring section 250 of the socket housing 200.

Several flexible sections 620 that extend in the direction of the central axis of the annular head section 610 and are circumferentially spaced apart from one another are integrally formed on the outer circumferential rim of the annular head section 610. Each flexible section 620 extends over a circular arc section in the circumferential direction and carries several locking or indexing teeth 622 on its outer end, which are located adjacent to one another in the circumferential direction. These locking or indexing teeth are respectively directed radially inwardly to the central axis of the annular head section 610.

A comb segment 640, or clamping member, that extends in transverse direction is integrally formed on the base or bottom of the groove-shaped longitudinal section 630. The comb segment extends from the groove bottom into the free space of the groove, however, inclined in the direction of the head section 610 to a certain degree. The comb segment consists of several teeth 642 that are provided closely adjacent to one another in the transverse direction and can be elastically bent due to their geometry.

The two outer teeth extend approximately to the upper edge of the groove and are spaced apart from the side walls of the groove by a significantly larger distance than the distance between the individual teeth 642. The teeth of the comb segment 640 which are arranged between the two outer teeth are made increasingly shorter in the direction of the groove center such that the free ends of the teeth 642 describe a profile that is slightly curved toward the groove bottom or, in other words, define a concave profile.

Figure 41:
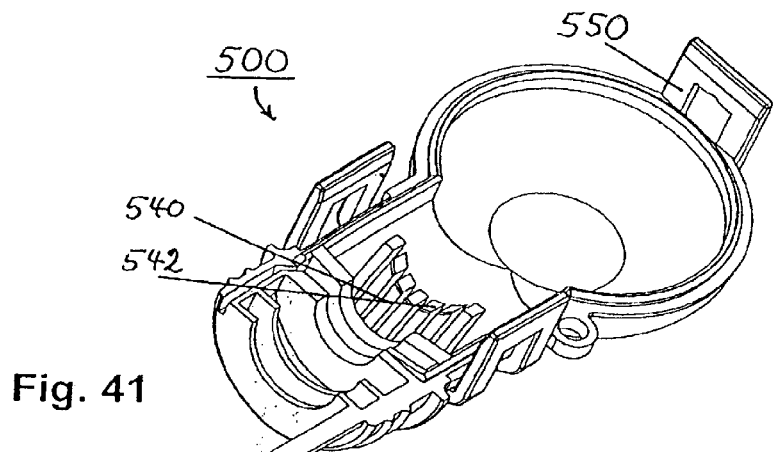
FIG. 41 is a perspective representation of the upper part of the angled end cap according to FIG. 39.
Figures 42, 43:
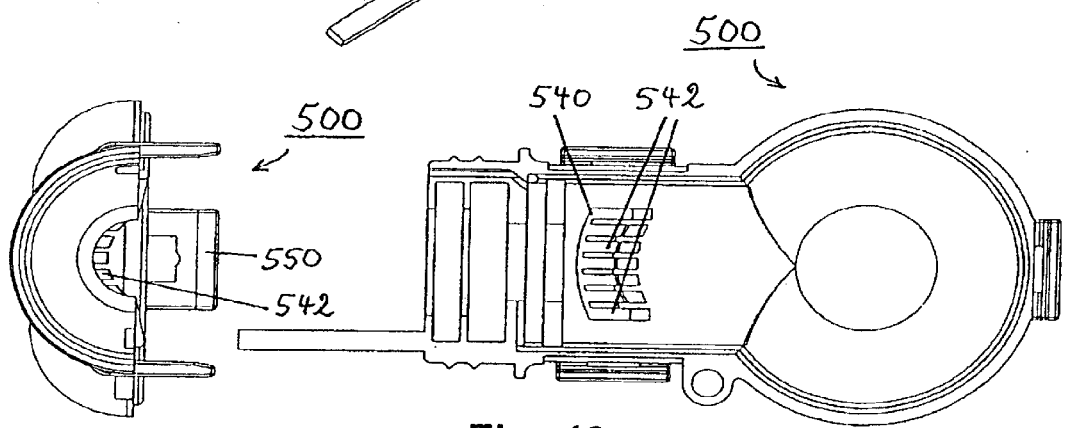
FIG. 42 is a bottom view of the upper part according to FIG. 41.
FIG. 43 is a top view of the inside of the upper part according to FIG. 41.
Figure 44:
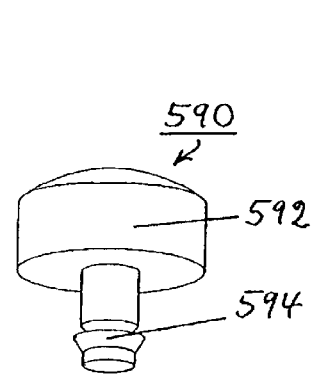
FIG. 44 is a perspective representation of the safety pin shown in FIG. 39.

FIGS. 41–43, in particular, show that a comb segment 540, or clamping member, is integrally formed on the groove bottom in the groove-shaped longitudinal section 510 of the upper part 500, namely at the same location as the comb section arranged in the groove-shaped longitudinal section 610 of the lower part 600. Analogous to the comb segment 640, the comb segment 540 consists of several teeth 542 that are located closely adjacent to one another and can be elastically bent. In other respects, the comb segment 540 has the same geometry, shape and position as the comb segment 640. The comb segment 540 consequently extends in the direction of the head section 510, i.e., into the free space of the groove, in an inclined or slanting manner.

FIGS. 39 and 40, in particular, show that the comb segment 640 is arranged at a location in the longitudinal section 630 at which the integral catch tabs 650 are also located. FIGS. 41–43, in particular, show that the comb segment 540 is accordingly arranged in the longitudinal section 530 at a location at which the catch hooks 540 are located. A lead sealing eyelet 632 is integrally formed on the outer surface of the longitudinal section 630 between a catch tab 650 and the head section 620. Analogously, a lead sealing eyelet 532 which corresponds to that of the lead sealing eyelet 632 on the lower part 600 is integrally formed at a location between a catch hook 550 of the longitudinal section 530 and the head section 510.

A longitudinal groove 652 is arranged in the catch tab 650 of the lower part 600, which catch tab is integrally formed on the head section 610. Said longitudinal groove 652 serves for receiving a safety pin 590 in the connected state, i.e., when the corresponding catch hook 550 on the head section 510 of the upper part is engaged with the catch tab 650. In this context, we refer to FIGS. 39 and 40. FIG. 39 also shows that the upper part 500 and the lower part 600 are connected to one another in a captive fashion by means of an integral flexible strap 56.

The 90° end cap which has been described with reference to FIGS. 39–45 provides the advantage that the lower part 600 can be preinstalled on a connector housing before the connector housing is equipped with the terminals that are already connected to a cable and before the cable is connected to terminals that are already arranged in the connector housing, respectively.

When mounting the lower part 600 on the ring section 250 of the socket housing 200, the flexible sections 620 which are provided such that they are slightly resilient radially outwardly are pushed over the circumferential web 256 of the ring section 250. The web 256 of the ring section 250 is slightly beveled in the connecting direction and the pushing movement is effected until the locking teeth 622 that may also be slightly beveled in the connecting direction engage or grip behind the circumferential web 256 and engage into the circumferential groove 252. In this state, the end face of the flexible section 620 abuts the wall of the circumferential groove 252 which is located opposite of the circumferential web 256 such that the lower part 600 is captured in the circumferential groove 252 and essentially cannot be displaced in the connecting direction. In addition, the catch tabs 254 of the ring section 250 which are integrally formed in the circumferential groove 252 engage with the catch tabs 622 integrally formed on the flexible sections 620. The lower part 600 installed on the ring section 250 of the socket housing 200 consequently can be rotated into several locked positions on the ring section 250, i.e., into a defined cable outlet position.

After having installed the terminals and the cable, respectively, the upper part 500 is arranged on the lower part 600 and firmly connected thereto by means of the catch hooks 550 and the catch tabs 650. After having interlocked the lower part 600 and the upper part 500, the safety pin 590 that is illustrated in detail in FIG. 44 can be pressed into an opening that is defined by the groove 652 of the catch tab 650 and the transverse arm of the catch hook 550.

The catch hook and the catch tab are provided in such a manner that this opening represents a clamping channel for a safety pin 590. Due to the slightly conical design of the front end of the pin section 594 of the safety pin 590, the safety pin 590 can be absolutely firmly pressed into the clamping channel. The head 592 of the safety pin 590 is then rigidly and firmly seated above the location to be secured. The firm press fit ensures with absolute certainty that the head 592 of the safety pin 590 shears off from the firmly clamped pin section 594 in case of an attempted manipulation. In this context, we refer, in particular, to FIG. 45 that shows a connected 90° end cap with inserted safety pin. The end cap shown in FIG. 45 is installed on the ring section 150 of the pin housing 100 of the pin connector.

In the installed and engaged state, the two comb segments 540 and 640 of the lower part 500 and the upper part 600 are located opposite to one another and cause a tension relief in the cable attached to the plug-type connector. This is the reason why the comb segments are slightly inclined in a direction opposite to the direction of the cable tension. In addition, the comb segments 540 and 640 are provided in such a manner that they are able to reliably relieve the tension of electric cables with different diameters. For this purpose, the free ends of the elastic teeth 542 and 642 define an opening between one another, that essentially has a flat, bi-convex cross section when no cable is inserted. Due to this constructive design of the teeth 542 and 642 that are inclined opposite to the direction of the cable tension, at least the teeth in the central region of the comb segments 540 and 640 firmly adjoin the cable and penetrate or dig into the cable similar to barbs when tension is exerted and an electric cable with a relatively small diameter is used.

When using a cable with a relatively large diameter, the teeth in the outer regions of the comb segments 540 and 640 also penetrate or dig into the cable similar to barbs when tension is exerted upon the cable. In this context, it should be noted that, when interlocking the end cap parts, the cable extending through the two comb segments urges the teeth into an even more inclined position, wherein the teeth in the outer region of the comb segments can also yield outwardly in the direction of the circumferential wall of the end cap. In an embodiment for cable diameters of 5.5–8.5 mm, the short axis or the clear height of the bi-convex cross section has a value of approximately 5 mm and the long axis or the clear width has a value of approximately 8.5 mm. This means that the geometry of the cross section is suitable for achieving a clamping effect over the entire range of cable diameters.

The embodiment of a straight end cap which is illustrated in FIGS. 46–48 consists of two shell-shaped cap parts, namely a lower part 800 and an upper part 700. The lower part 800 and the upper part 700 match one another and essentially differ from one another merely in that catch tabs 850 are integrally formed onto the lower part 800 and catch hooks 750 that cooperate with the catch tabs 850 are integrally formed onto the upper part 700. The lower part 800 has an essentially hollow, semi-cylindrical longitudinal section 830 that essentially corresponds to the longitudinal section 630 of the lower part 600. The longitudinal section 830 of approximately groove-shaped cross section contains a comb segment 840 with several elastic teeth 842, which corresponds to the comb segment 640 and is also inclined opposite to the table tension. A groove 852 for receiving a safety pin 790 is provided in the catch tab 850 that is integrally formed on the longitudinal section 830.

Furthermore, the lower part 800 contains a head section 810 that is integrally formed on the longitudinal section 830. The head section 810 has an essentially hollow, semi-cylindrical shape, but larger radial dimensions in comparison to the longitudinal section 830. A collar 820 in the form of a semicircular ring which radially inwardly protrudes is integrally formed on the end of the head section 810. Said collar carries locking teeth 822 that extend radially inwardly.

The upper part 700 has a longitudinal section 730 that corresponds to the longitudinal section 530 of the upper part 500. As in the longitudinal section 530, a comb segment 740 that protrudes into the free space of the groove is integrally formed on the base or bottom of the groove-shaped section 730. Analogous to the comb segment 540, the comb segment 740 comprises several elastic teeth 742 that are located adjacent to one another in the transverse direction and are inclined opposite to the cable tension.

The upper part 700 also comprises a head section 710 that is integrally formed on the longitudinal section 730 and, with the exception of the design of the catch elements 750 and 850, is provided identical to the head section 810 of the lower part 800. Accordingly, a collar 522 in the shape of a semicircular ring which extends radially inwardly is integrally formed at the free end of the head section 710.

FIG. 48 shows the straight end cap in a state in which the upper part 700 is arranged on and interlocked with the lower part 800. As in the 90° end cap, the free teeth 742 and 842 define an opening between one another when no cable is inserted and said opening has an essentially flat, bi-convex cross section.

In order to simplify the installation on the ring section 150 or 250 of the pin housing 100 or the socket housing 200, respectively, two flexible arms 825 are integrally formed on the inner wall of the semicircular head section 810 of the lower part 800. These flexible arms protrude over the semicircular head section 810 in the circumferential direction.

FIGS. 49–52 show an embodiment of a seven-pole pin housing 1000 of a seven-pole plug-type connector. The outside contour of the seven-pole pin housing 1000 essentially corresponds to that of the above-described four-pole pin housing 100. Hence, the design and the functions of the outer outline of the pin housing 1000 are not described again.

The design of the interior of the seven-pole pin housing 1000 differs from that of the four-pole pin housing 100 essentially with respect to the number and the arrangement of the terminal receiving cavities, as well as the coding provisions that are adapted to the seven-pole embodiment. Seven terminal receiving cavities that are arranged parallel to one another extend through the pin housing 1000 in the longitudinal direction. The cavities are provided adjacent to a receiving opening 1110 for receiving a matching plug-in section of a seven-pole socket housing, that is described further below, and extend up to the housing end on the terminal receiving end. The seven terminal receiving cavities consist of an inner terminal receiving chamber 1602, the longitudinal axis of which coincides with the longitudinal axis of the pin housing, and six outer terminal receiving cavities 1600 that circularly surround the inner terminal receiving chamber 1602 and are respectively offset relative to one another by an angle of 60°.

Analogous to the pin housing 100, the pin housing 1000 also comprises a transverse wall 1700 that is integrally formed on the outer side of the sleeve-shaped chambers 1600 and 1602, as well as on the inside of the pin housing 1000. The transverse wall 1700 is located in a housing portion between the threaded section 1300 and the flange 1400.

The terminal receiving cavities 1600 and 1602 have an inside contour that essentially corresponds to that of the terminal receiving cavities 160. Each terminal receiving chamber 1600 and 1602 can thus receive a (not-shown) contact pin or pin terminal that is inserted from the terminal receiving end and retain said pin terminal by means of primary locking. The design of the pin terminals may correspond to that of the pin terminals 195.

Analogous to the terminal receiving cavities 160, the terminal receiving cavities 1600 have radially inwardly directed openings 1650 that correspond to the openings 165 of the terminal receiving cavities 160. The terminal receiving chamber 1602 has a radially outwardly directed opening 1652 at the same height or level as the terminal receiving cavities 1600 have the opening 1650. Relative to the central axis of the inner chamber 1602, the opening 1652 extends over an angle of 65 degrees and is angularly aligned in a manner that one of its halves is located opposite to the opening 1650 in one of the outer chambers 1600 and its other half is located opposite to the center between this outer chamber 1600 and an adjacent outer chamber 1600. In addition, a longitudinal slot 1654 is provided in the wall of the inner terminal receiving chamber 1602. Said longitudinal slot extends from the half of the opening 1652 which is located opposite to the outer chamber 1602 to the end of the terminal receiving chamber 1602 on the mating side.

A recess 1702 (FIG. 52) is provided in the transverse wall 1700 adjacent to the opening 1652. The recess 1702 extends over the angular range of the opening 1652 and is designed such that it extends radially outwardly at the end of the opening 1652 that is aligned with the longitudinal slot 1654. In the direction towards the other end of the opening, the recess 1702 then has an increasingly smaller radial distance from the central axis of the inner chamber 1602.

Four coding ribs 1120, 1122, 1140 and 1142 and three guiding ribs 1150 are integrally formed on the inside of the pin housing 1000. Said ribs extend in the longitudinal direction of the pin housing 1000 from the transverse wall 1700 to a point in the vicinity of the end of the receiving opening 1110 on the mating side. The guiding ribs 1150, however, starting from the transverse wall 1700, do not longitudinally extend up to the end of the receiving opening 1110, but only to the end of the terminal receiving cavities 1600 and 1602 on the mating side. As described further below, three guiding ribs 1850 that are integrally formed on a secondary locking element 1800 of the pin housing take over the function of the guiding ribs 1150 in the receiving opening 1110 when the secondary locking element 1800 inserted in the pin housing 1000 is rotated in a locking position. Different arrangements of the coding ribs conventionally serve for coding different contact pin arrangements of the seven-pole pin housing 1000.

The outside contours of the seven terminal receiving cavities 1600 and 1602 define an insertion chamber, into which the secondary locking element 1800 of the pin housing shown in FIGS. 53–55 can be inserted and, once inserted, rotated into a locking position about its longitudinal axis. Analogous to the secondary locking element 180, the secondary locking element 1800, in addition to the primary locking means, constitutes a secondary locking means for the pin terminals (not-shown) that are inserted into the terminal receiving cavities 1600 and 1602 of the pin housing 1000.

With respect to its basic design and its basic function, the secondary locking element 1800 corresponds to the secondary locking element 180. However, it has to be made sure that the secondary locking element 1800 can also reliably lock a contact pin or pin terminal that is inserted into the inner terminal receiving chamber 1602.

FIGS. 53–55 show that the secondary locking element 1800 consists of an essentially hollow-cylindrical, profiled insertion body, on one end of which an annular blocking flange 1820 is integrally formed. The holding flange 1820 is located in a radial plane that extends perpendicular to the longitudinal axis of the insertion body. Three narrow arms or webs 1810 that extend radially outwardly are integrally formed on the blocking flange 1820 at locations that are offset relative to one another by 120°. A section 1830 in the form of an arc segment is provided adjacent to each web. The webs 1810 and the segment-shaped sections 1830 are located in the same plane as the annular blocking flange 1820. Each of the segment-shaped sections 1830 carries one of the three aforementioned guiding ribs 1850 on the side that faces away from the insertion body and said guiding ribs essentially extend parallel to the longitudinal axis of the profiled insertion body.

The insertion body of the secondary locking element 1800 comprises an essentially hollow-cylindrical indexing or click-stop section 1840 that adjoins the annular blocking flange 1820. Twelve longitudinal depressions 1860 are respectively offset relative to one another by 30° and are arranged on the outer circumference of this click-stop section. The longitudinal depressions 1860 extend parallel to the longitudinal axis of the insertion body and have a hollow profile approximately in the form of a circular arc. Longitudinal humps 1870 that are slightly curved radially outwardly are provided between the longitudinal depressions 1860. Consequently, the click-stop section 1840 has, if viewed in cross section, a slightly undulating outside profile with twelve depressions that correspond to the longitudinal depressions 1860 and twelve elevations that correspond to the longitudinal humps 1870.

A section that, if viewed in cross section, also has a hollow-cylindrical profile located adjacent to the click-stop section 1840. This hollow-cylindrical section has an outside diameter that is slightly smaller than the average diameter of the click-stop section 1840 and carries six locking knobs 1880 that protrude radially outwardly and are provided at the section end that faces away from the click-stop section 1840. The integral locking knobs 1880 are angularly aligned with every second longitudinal depression 1860 and are consequently offset relative to one another by 60°.

The hollow-cylindrical section that carries the locking knobs 1880 respectively comprises a recess 1910 and 1912 between two adjacent locking knobs of its six locking knobs 1880, with said recesses respectively extending up to the click-stop section 1840. At the click-stop section 1840, the recesses 1910 and 1912 respectively are provided adjacent one longitudinal depression 1860 that is not aligned with one of the locking knobs 1880. Respective tongues 1900 and 1862 that are integrally formed on the click-stop section 1840 extend from these two longitudinal depressions 1860 and in a cantilevered manner into the recesses 1910 and 1912. The tongues 1900 and 1862 extend in the longitudinal direction of the secondary locking element 1800 and are resilient in the radial direction due to their geometry.

The resilient tongue 1900 corresponds to the tongue 190 of the secondary locking element 180 and carries a holding hook 1920 that protrudes radially outwardly on its free end. The resilient tongue 1862 carries a locking knob 1882 that protrudes radially inwardly on its free end and said locking knob is located at the level of the locking knobs 1880 while its free end protrudes over the hollow-cylindrical section that carries the locking knobs 1880 in the longitudinal direction.

When assembling the seven-pole pin connector, the secondary locking element 1800 is, analogous to the above-described four-pole pin connector, initially inserted into the insertion chamber between the terminal receiving cavities 1600 and 1602 of the pin housing 1000, namely such that its end (at 1880, 1882) on the locking knob side is the leading end. Due to the contour of the pin housing 1000 and the contour of the secondary locking element 1800 of the pin, this insertion is only possible if the longitudinal axes of the pin housing 1000 and the secondary locking element 1800 are aligned to one another and the secondary locking element 1800 has a predetermined angular position relative to the pin housing 1000.

The angular inserting position is reached when the longitudinal slot 1654 of the inner terminal receiving chamber 1602 is angularly aligned with the locking knob 1882 on the resilient tongue 1862 of the secondary locking element 1800 such that the locking knob 1882 can enter the opening 1652 through the longitudinal slot 1654. In this angular inserting position, the locking knobs 1880 are angularly displaced by 30° relative to the central longitudinal axes of the terminal receiving cavities 1600. This means that the locking knobs 1880 are respectively located between two adjacent terminal receiving cavities 1600, while the locking knob 1882 is angularly aligned with one of the outer terminal receiving cavities 1600.

The resilient tongue 1900 with the holding hook 1920 is also angularly aligned with one of the outer terminal receiving cavities 1600 such that the holding hook 1920 enters into the opening 1650 of the angularly aligned terminal receiving chamber 1600 and engages or grips behind a shoulder that corresponds to the shoulder 173 of the pin housing 100. This state is reached when the secondary locking element 1800 is completely inserted into the pin housing 1000 and the blocking flange 1820 adjoins the ends of the terminal receiving cavities 1600 and 1602 on the mating side. In addition, the extended free end of the locking knob 1882 engages into the region of the recess 1702 (FIG. 52) in the transverse wall 1700 which region is angularly aligned with the longitudinal slot 1654.

In the initial inserting position, the secondary locking element 1800 that is inserted into the pin housing 1000 cannot be rotated unintentionally due to the fact that the terminal receiving cavities 1600, with their outer wall sections that are located opposite to the click-stop section 1840 of the secondary locking element 1800, engage into the longitudinal depressions 1860 of the secondary locking element 1800 which are not aligned with the locking knobs 1880. The interior of the hollow-cylindrical insertion body of the secondary locking element 1800 has such dimensions that it can receive the inner terminal receiving chamber 1602 in the inserted state. The through-opening in the annular blocking flange 1820 has such dimensions that, on the one hand, the pin of a contact pin or pin terminal inserted into the inner terminal receiving cavity can pass through said opening and, on the other hand, that a tool can be inserted in order to rotate the secondary locking element 1800 in a click-stop manner resulting from the outer contour of the click-stop section 1840 and the outer contour of the walls of the outer terminal receiving cavities 1600.

In the initial inserting position, the guiding ribs 1850 that are integrally formed onto the secondary locking element 1800 are angularly displaced by 30° relative to the guiding ribs 1150 integrally formed on the pin housing 1000. Consequently, a connection with a socket housing cannot be effected in the initial inserting position as described above with reference to the four-pole pin housing 100.

The annular blocking flange 1820, the bridge-shaped webs 1810 and the section 1830 of the secondary locking element 1800 which has the shape of an arc segment have such dimensions that the pin terminals can be inserted into the terminal receiving cavities 1600 and 1602 and retained therein by means of primary locking. After the contacts or terminals are installed, the secondary locking element 1800 is rotated by 30° from the initial inserting position into a position in which the guiding ribs 1850 are aligned with the guiding ribs 1150 and the locking knobs 1880 enter the openings 1650 of the outer terminal receiving cavities 1600 and engage or grip behind the collars provided on the pin terminals.

The secondary locking element is rotated by means of a tool that is inserted into the central opening of the blocking flange 1820. When rotating the secondary locking element 1800 from the initial non-locking position into the locking position, the locking knob 1882 is urged radially inwardly under the influence of the recess 1702 such that the contact pin inserted into the inner terminal receiving chamber 1602 is also retained by means of the secondary locking element. In this respect, it should also be mentioned that the locking knob 1882 has such dimensions that it does not impair the insertion of a contact pin into the inner terminal receiving chamber 1602 in the initial inserting position or non-locking position.

As in the four-pole plug-type connector, the secondary locking element 1800 is rotated from the initial inserting position or non-locking position into the locking position that is offset relative to the non-locking position by 30° by exerting a force with the aid of the tool inserted into the blocking flange 1820. The exerted force overcomes the contact pressure of the longitudinal humps 1870 which are curved radially outwardly and are arranged between the longitudinal depressions 1860. Analogous to the four-pole connector, the secondary locking element 1800 snaps from the non-locking position into the locking position when it is rotated due to a slight elastic deformation and is held in a precisely defined angular position. The bridge-like webs 1810 which are located in the region of the pin terminals protruding from the terminal receiving cavities 1600 have such dimensions that they do not impair the forced click-stop rotation of the secondary locking element 1800.

A connection with a matching socket housing can be effected in the locking position in which the guiding ribs 1850 of the secondary locking element 1800 are aligned with the guiding ribs 1150 of the pin housing 1000. A seven-pole socket connector that matches the seven-pole pin connector according to FIGS. 49–55 is shown in FIGS. 56–62. The seven-pole socket connector shown essentially consists of a seven-pole socket housing 2000, a secondary locking element 2800 for the socket housing 2000 and socket terminals (not-shown) that correspond to the socket terminals 295 of the previously described four-pole socket housing 200. The socket housing 2000 essentially has the same outside contour as the socket housing 200 and essentially differs from this previously described socket housing in that seven terminal receiving cavities are provided instead of four terminal receiving cavities, and in that a different coding is provided.

Coding grooves 2120 and 2140, as well as 2122 and 2142, are arranged on the outer side of the plug-in section 2100 of the socket housing 2000 which can be inserted into the receiving opening 1110 of the pin housing 1000. The coding grooves extend parallel to the longitudinal axis of the socket housing 2000. The position and shape of the four coding grooves 2120, 2140, 2122 and 2142 are adapted to those of the coding ribs 1120, 1122, 1140 and 1142 of the pin housing 1000. In addition, three guiding grooves 2150 that extend parallel to the longitudinal axis of the socket housing 2000 are provided on the outer side of the plug-in section 2100. The guiding grooves 2150 have a shape that matches that of the guiding ribs 1850 on the secondary locking element 1800 of the pin and are located in a position that corresponds to that of the guiding ribs 1850 when the secondary locking element 1800 is locked in the aforementioned locking position.

Six terminal receiving cavities 2600 that extend parallel to one another are circularly arranged around the longitudinal axis of the socket housing inside the socket housing 2000. These six outer terminal receiving cavities 2600 surround a central terminal receiving chamber 2602, the longitudinal axis of which coincides with that of the socket housing 2000. The terminal receiving cavities 2600 and 2602 extend from the end of the socket housing 2000 on the mating side to the end on the terminal receiving end and take a position that corresponds to that of the terminal receiving cavities of the pin housing 1000.

Analogous to the terminal receiving cavities described so far, the terminal receiving cavities 2600 and 2602 have an inside contour which ensures that a contact socket or socket terminal inserted into one of the terminal receiving cavities is retained therein by means of primary locking. At the level of the installation section 2300, a transverse wall 2700 is integrally formed on the outer walls of the terminal receiving cavities 2600 and 2602 and on the inner wall of the socket housing 2000. Between the transverse wall 2700 and the end of the socket housing 2000 on the mating side, the outer terminal receiving cavities 2600 are spaced apart from the inner terminal receiving chamber 2602 by an essentially annular intermediate space. This intermediate space forms the insertion chamber for inserting the secondary locking element 2800 of the socket.

Radially directed openings 2650 that correspond to the radially directed openings 1650 in the terminal receiving cavities 1600 are provided in the terminal receiving cavities 2600. Analogously, a radial opening 2652 that corresponds to the opening 1652 in the terminal receiving chamber 1602 is provided in the terminal receiving cavity 2602. In addition, a longitudinal slot 2654 that corresponds to the longitudinal slot 1654 in the terminal receiving cavity 1602 is provided in the terminal receiving cavity 1602.

Analogous to the secondary locking element 1800 of the pin housing, the secondary locking element 2800 of the socket comprises a hollow-cylindrical, profiled insertion body. The insertion body of the secondary locking element 2800 has a click-stop section 2840 that corresponds to the click-stop section 1840 of the secondary locking element 1800. On the outer circumference of the section 2840, twelve longitudinal depressions 2860 that extend in the direction of the longitudinal axis of the secondary locking element 2800 are provided, wherein said longitudinal depressions are respectively separated from one another by a longitudinal hump 2870. The twelve longitudinal depressions 2860 are circumferentially offset relative to one another by 30°.

Three cover blades 2820 that protrude radially outwardly are integrally formed on the free end of the click-stop section 2840, with said cover blades being circumferentially offset relative to one another by 120°. The cover blades 2820 are respectively aligned with one of the longitudinal depressions 2860.

At the end that is located opposite of the cover blades 2820, the click-stop section 2840 passes over into a section that is essentially provided identical to the corresponding section of the secondary locking element 1800 of the pin housing. Consequently, this section carries locking knobs 2880 that protrude radially outwardly and correspond to the locking knobs 1880, a locking knob 2882 that protrudes radially inwardly and corresponds to the locking knob 1882, a resilient tongue 2862 that carries the locking knob 2882 and corresponds to the tongue 1862, a holding hook 2920 that protrudes radially outwardly and corresponds to the holding hook 1920, and a resilient tongue 2900 which carries the holding hook 2920 and corresponds to the resilient tongue 1900. In addition, recesses 2910 and 2912 that correspond to the recesses 1910 and 1912 are provided.

Analogous to the tongue 1862 (or the locking knob 1882, respectively), the tongue 2862 (or the locking knob 2882, respectively) also comprises an axial extension on its free end which cooperates with a recess 2702 in the transverse wall 2700, which corresponds to the recess 1702. On the end of the secondary locking element 2800 which carries the cover blades 2820, a central through-opening 2940 is provided in such a manner that a tool can be inserted, analogously to the secondary locking element 1800.

When assembling the socket connector, the secondary locking element 2800 is initially inserted into the chamber inside the plug-in section 2100 of the socket housing 2000. This chamber is defined by the opposing outer walls of the six outer terminal receiving cavities 2600 and the central terminal receiving cavity 2602. The insertion is effected such that the end (at 2880, 2882) on the locking knob side is the leading end. The secondary locking element is inserted until the cover blades 2820 of the secondary locking element 2800 abut the end of the terminal receiving cavities 2600 on the mating side.

The outside contour of the terminal receiving cavities 2600 and the outside contour of the secondary locking element 2800 are adapted to one another in such a manner that an axially aligned secondary locking element can only be inserted in an angular position in which the locking knob 2882 is angularly aligned with the longitudinal slot 2654. The inserting position of the secondary locking element 2800 of the socket consequently corresponds to that of the secondary locking element 1800 of the pin housing. In this respect, reference is made to the corresponding explanation of the seven-pole pin connector.

In the initial inserting position, the three cover blades 2820 respectively cover the end of three outer terminal receiving cavities 2600 on the mating side. In the initial inserting position that, analogous to the secondary locking element 1800 of the pin housing, represents the non-locking position, a connection with the socket housing cannot be effected because the pins of the pin housing are unable to enter the terminal receiving cavities of the socket housing.

As with the pin housing 1000, the terminal receiving cavities 2600 and 2602 can, in the initial inserting position or non-locking position, be provided with socket terminals from the end of the socket housing 2000 on the terminal receiving end. After the terminal receiving cavities 2600 and 2602 have been provided with the socket terminals, the secondary locking element 2800 is rotated about its longitudinal axis by 30°, namely from the non-locking position into the locking position, and by means of an inserted tool. This is effected in exactly the same manner as with the secondary locking element 1800 of the pin housing. The cover blades 2820 are designed in such a manner that, in the locking position, they expose the sockets of the socket terminals inserted into the terminal receiving cavities and the pin terminals of the pin connector can be inserted.

The self-locking nut 300, the coupling ring 400, the 90° end cap 500, 600 and the straight end cap 700, 800 including the safety pins 490 and 590 may be analogously used in the described seven-pole connector.

In one embodiment, the parts were manufactured from PBT (polybutyleneterephthalate) with 30% GF (glass fiber), wherein the end caps for a non-sealed design were manufactured from PBT and the end caps for a sealed design were manufactured from PBT with 30% GF. However, other plastic or insulating materials can also be used.

Even though different aspects of the invention are illustrated and explained by referring to an electrical connector, it should be understood that many subject matters disclosed in the present application such as the tension relieving device, the self-locking nut in cooperation with the related outer thread, the end caps and the safety pin means can be used for various different applications.

We claim:

1. A self-locking screw connection comprising a cylindrical thread section (130) and a nut (300) that can be snapped onto the cylindrical thread section (130), the nut (300) has a thread that is divided into several thread segments (322), and the cylindrical thread section (130) has a plurality of threadless chambers (134) that are spaced from one another along the circumference of the cylindrical thread section (130), wherein said threadless chambers allow immersion of one of said thread segments into one of said threadless chambers for providing a self-locking effect.

2. The electrical connector according to claim 1, wherein a leading end of each thread segment (322) of the self-locking nut (300) has an inclined starting surface (324) and a trailing end of each thread segment (322) has a stopping edge (326).

3. The electrical connector according to claim 1, wherein the thread segments (322) of the self-locking nut (300) are offset radially inwardly relative to a nominal thread size.

4. The electrical connector according to claim 1, wherein the self-locking nut (300) has a thread size that is smaller than that of the threaded section (130) of the housing.

5. The electrical connector according to claim 1, wherein said cylindrical thread section (130) forms part of a housing of an electrical connector.

6. The electrical connector according to claim 1, wherein said several thread segments (322) are integrally formed onto a support ring (310) in a resilient manner.

* * * * *

UNITED STATES PATENT AND TRADEMARK OFFICE
CERTIFICATE OF CORRECTION

PATENT NO. : 6,945,829 B2
DATED : September 20, 2005
INVENTOR(S) : Finzer et al.

Figure 49:
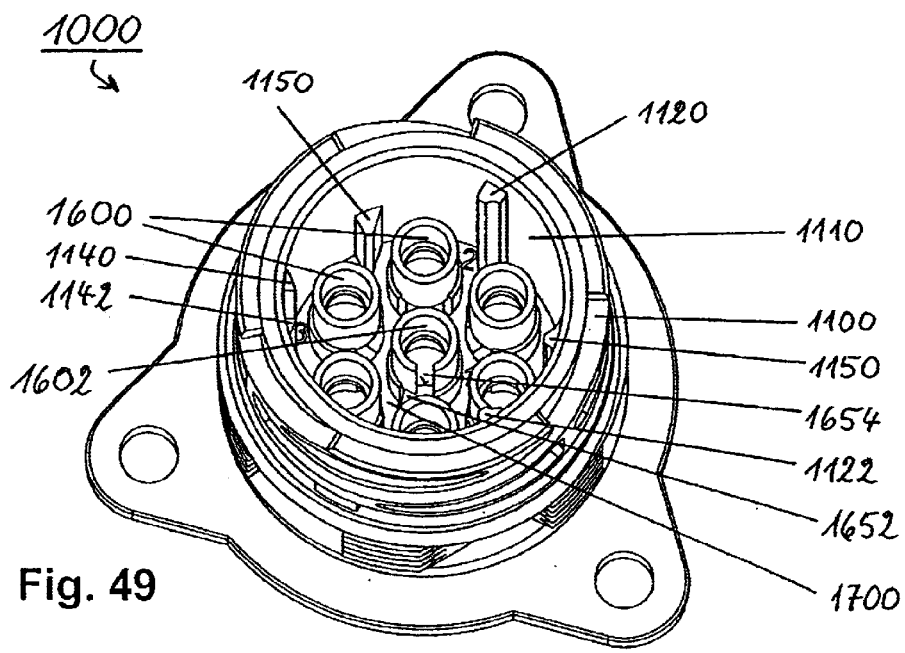
FIG. 49 is a perspective representation of a seven-pole pin housing of a seven-pole pin connector.
Figure 50:
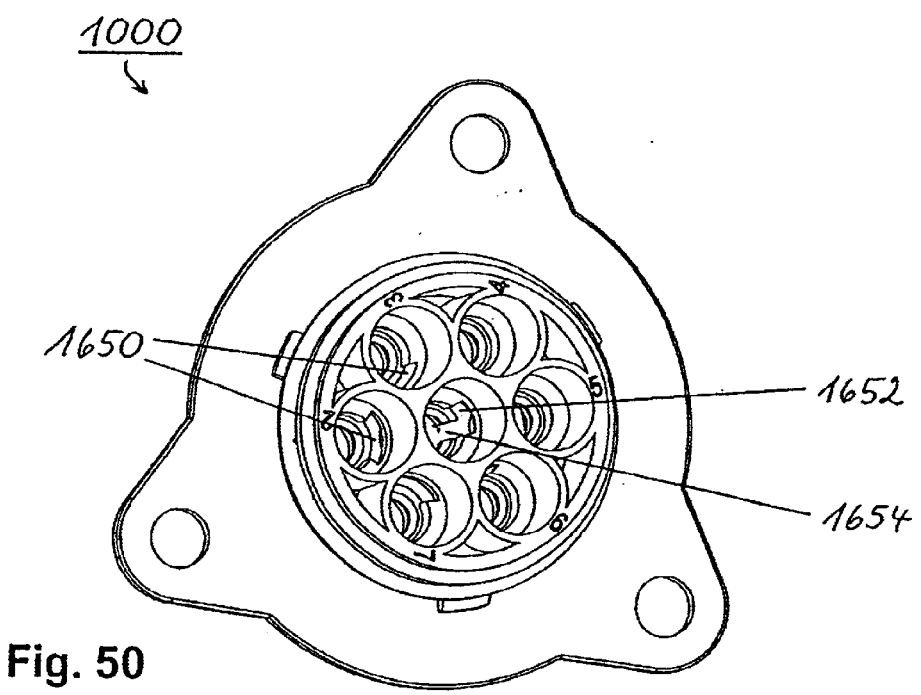
FIG. 50 is a perspective representation of the pin housing according to FIG. 49 from a different viewing angle.
Figure 51:
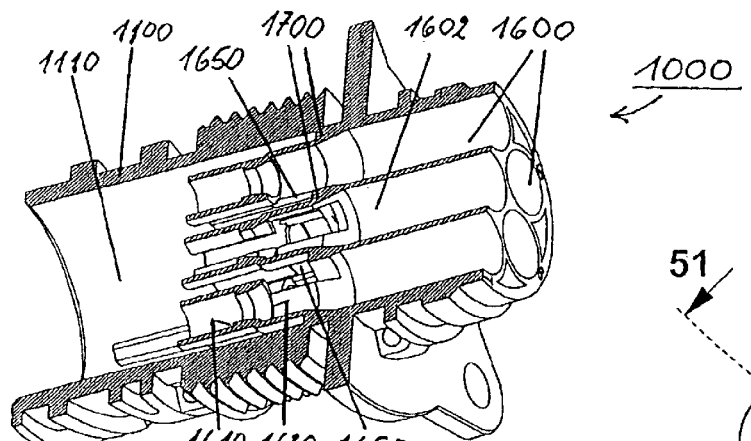
FIG. 51 is a longitudinal section through the pin housing according to FIG. 49.
Figure 51A:
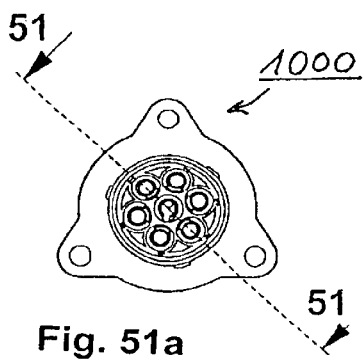
Figure 52:
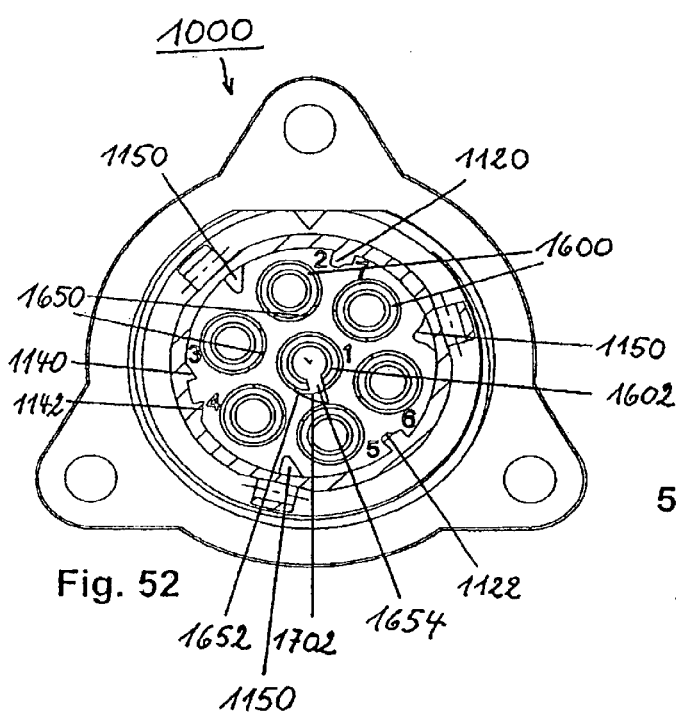
FIG. 52 is a cross section through the pin housing according to FIG. 49 in which the terminal receiving cavities are viewed from the mating side.
Figure 52A:
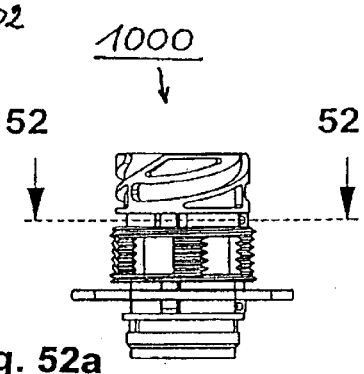

It is certified that error appears in the above-identified patent and that said Letters Patent is hereby corrected as shown below:

Column 6,
Lines 23-27, should be replaced with:
-- FIG. 51 is a longitudinal section along line 51-51 of FIG. 51a through the pin housing according to FIG. 49;
FIG 51a is an end view of the pin housing according to FIG. 49;
FIG. 52 is a cross section along line 52-52 of FIG. 52a through the pin housing according to FIG. 49 in which the terminal receiving cavities are viewed from the mating side;
FIG. 52a is a side view of the pin housing according to FIG. 49; --.

Signed and Sealed this

Fourteenth Day of February, 2006

JON W. DUDAS
*Director of the United States Patent and Trademark Office*